United States Patent
Kita et al.

(10) Patent No.: US 12,133,141 B2
(45) Date of Patent: Oct. 29, 2024

(54) NETWORK SERVICE CONSTRUCTION SYSTEM AND NETWORK SERVICE CONSTRUCTION METHOD

(71) Applicant: RAKUTEN SYMPHONY, INC., Tokyo (JP)

(72) Inventors: Shinya Kita, Tokyo (JP); Puneet Devadiga, Tokyo (JP); Mohit Luthra, Singapore (SG); Rahul Atri, Singapore (SG); Tareq Amin, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 86 days.

(21) Appl. No.: 17/758,630

(22) PCT Filed: Feb. 25, 2021

(86) PCT No.: PCT/IB2021/051565
§ 371 (c)(1),
(2) Date: Jul. 11, 2022

(87) PCT Pub. No.: WO2021/171210
PCT Pub. Date: Sep. 2, 2021

(65) Prior Publication Data
US 2023/0040676 A1 Feb. 9, 2023

(30) Foreign Application Priority Data
Feb. 26, 2020 (JP) .................................. 2020-031065

(51) Int. Cl.
*H04W 4/029* (2018.01)
(52) U.S. Cl.
CPC .................................. *H04W 4/029* (2018.02)
(58) Field of Classification Search
CPC .................................................... H04W 4/029
(Continued)

(56) References Cited

U.S. PATENT DOCUMENTS

| 10,637,753 B1 | 4/2020 | Taft et al. |
| 2002/0174191 A1 | 11/2002 | Robertson et al. |

(Continued)

FOREIGN PATENT DOCUMENTS

| CN | 106464742 A | 2/2017 |
| CN | 105224392 B | 7/2018 |

(Continued)

OTHER PUBLICATIONS

"The practice of continuous integration and continuous delivery on AWS" [online], Amazon Web Services, Inc., 2017, pp. 1-36, https://d1.awsstatic.com/International/ja_JP/Whitepapers/practicing-continuous-integration-continuous-delivery-on-AWS_JA_final.pdf, pp. 1-32, 37pp.

(Continued)

*Primary Examiner* — Wing F Chan
*Assistant Examiner* — Leon Y Tseng
(74) *Attorney, Agent, or Firm* — HAUPTMAN HAM, LLP

(57) ABSTRACT

Provided are a network service construction system and a network service construction method which are capable of flexibly constructing network services that satisfy various needs. A purchase management module receives service requirement data indicating a service requirement. An E2EO module and an inventory management module identify, based on the service requirement data, a configuration of a functional unit group that achieves a network service. Based on the identified configuration and template data in which the configuration is acceptable as a parameter, a CMaaS module, a service manager module, and a slice manager module identify a construction procedure of the functional unit group. The CMaaS module, the service manager module, the slice manager module, and a container management (Continued)

module construct the functional unit group by executing the identified construction procedure.

20 Claims, 29 Drawing Sheets

(58) Field of Classification Search
USPC .................................................... 455/456.1
See application file for complete search history.

(56) References Cited

U.S. PATENT DOCUMENTS

| | | |
|---|---|---|
| 2008/0243822 A1 | 10/2008 | Campbell et al. |
| 2010/0312893 A1 | 12/2010 | Watanabe et al. |
| 2011/0199255 A1 | 8/2011 | Murray et al. |
| 2014/0003408 A1 | 1/2014 | Chhabra et al. |
| 2014/0297866 A1 | 10/2014 | Ennaji et al. |
| 2014/0301192 A1 | 10/2014 | Lee et al. |
| 2014/0317293 A1 | 10/2014 | Shatzkamer |
| 2015/0309962 A1 | 10/2015 | Lichman et al. |
| 2016/0004551 A1 | 1/2016 | Terayama et al. |
| 2016/0248860 A1 | 8/2016 | Dunbar et al. |
| 2016/0328814 A1 | 11/2016 | Prichard et al. |
| 2016/0337175 A1 | 11/2016 | Rao |
| 2016/0337179 A1 | 11/2016 | Rao |
| 2016/0337180 A1 | 11/2016 | Rao |
| 2016/0337193 A1 | 11/2016 | Rao |
| 2016/0337473 A1 | 11/2016 | Rao |
| 2016/0337474 A1 | 11/2016 | Rao |
| 2017/0006083 A1* | 1/2017 | McDonnell ............. H04L 41/12 |
| 2017/0078410 A1 | 3/2017 | Rao |
| 2017/0311228 A1* | 10/2017 | Zavesky ............... H04W 4/029 |
| 2017/0359693 A1* | 12/2017 | Rao ........................ H04W 4/70 |
| 2018/0034703 A1* | 2/2018 | Anholt ............... H04L 41/0895 |
| 2018/0176088 A1 | 6/2018 | Ellappan et al. |
| 2018/0204234 A1* | 7/2018 | Hermoni ............... H04L 41/145 |
| 2019/0058636 A1 | 2/2019 | Xia |
| 2019/0124513 A1 | 4/2019 | Raleigh et al. |
| 2019/0312772 A1 | 10/2019 | Zhao et al. |
| 2019/0334909 A1 | 10/2019 | Schmitt et al. |
| 2019/0342184 A1 | 11/2019 | May |
| 2019/0342187 A1 | 11/2019 | Zavesky et al. |
| 2020/0013107 A1 | 1/2020 | Kusano |
| 2020/0145833 A1 | 5/2020 | Thakolsri et al. |
| 2020/0210572 A1* | 7/2020 | Devane ................. G06F 21/566 |
| 2020/0382386 A1 | 12/2020 | Narendra et al. |
| 2021/0250814 A1 | 8/2021 | Poe et al. |
| 2021/0306938 A1 | 9/2021 | Seetharaman et al. |
| 2021/0360741 A1 | 11/2021 | Shimojou et al. |
| 2022/0116394 A1 | 4/2022 | Schmitt et al. |
| 2022/0141681 A1 | 5/2022 | Flesch |
| 2023/0155957 A1 | 5/2023 | Paraschiv et al. |

FOREIGN PATENT DOCUMENTS

| | | |
|---|---|---|
| CN | 110086640 A | 8/2019 |
| EP | 3089032 A1 | 11/2016 |
| IN | 106792739 A | 5/2017 |
| JP | 2017527151 A | 9/2017 |
| JP | 2019521533 A | 7/2019 |
| JP | 2020504552 A | 2/2020 |
| TW | 201928707 A | 7/2019 |
| WO | 2014024251 A1 | 2/2014 |
| WO | 2018034321 A1 | 2/2018 |
| WO | 2018181826 A1 | 10/2018 |
| WO | 2019064678 A1 | 4/2019 |
| WO | 2020069758 A1 | 4/2020 |

OTHER PUBLICATIONS

Gerardo Garcia, "Day-0, day-1 and day 2 configuration in OSM", [online], ESTI, 2018, pp. 1-17, https://osm.etsi.org/wikipub/images/7/72/Day-1_and_day-2_configuration_in_OSM_Zero_Touch_Car_-_Gerardo.pdf, pp. 1-17, 17pp.
International Search Report in PCT Application No. PCT/IB2020/058695, mailed Dec. 22, 2020, 5pp.
International Search Report in PCT Application No. PCT/IB2021/051565, mailed Jun. 1, 2021, 6pp.
Office Action in U.S. Appl. No. 17/758,699, dated Sep. 21, 2023, 28pp.
Extended European Search Report in EP Application No. 21760096.4, dated Feb. 23, 2024, 12pp.
Office Action in U.S. Appl. No. 18/499,218, dated Jul. 25, 2024, 26pp.

* cited by examiner

FIG.3

VOICE COMMUNICATION SERVICE

| | |
|---|---|
| NUMBER OF SUBSCRIBERS | 50,000 |
| OPPOSITE IP | 10.5.6.8 |
| MONITORING TARGET | ATTACH NUMBER ▽ |
| MONITORING INTERVAL | FIVE MINUTES ▽ |
| TARGET AREA | SETAGAYA WARD ▽ |
| PASSWORD | ******* |

32

[ Next ]

FIG.9

| PRODUCT CATALOG DATA |
| --- |
| SERVICE CATALOG DATA |
| INVENTORY TEMPLATE DATA |
| CM TEMPLATE DATA |
| SERVICE TEMPLATE DATA |
| SLICE TEMPLATE DATA |
| MONITORING SCRIPT DATA |
| SECURITY SCRIPT DATA |
| HELM CHART DATA |
| CONTAINER IMAGE DATA |

FIG.12

| | RESOURCE POOL GROUP ID | 100 | |
|---|---|---|---|

| RESOURCE POOL ID | TOTAL CORE NUMBER DATA | REMAINING CORE NUMBER DATA | CNF TYPE DATA |
|---|---|---|---|
| A | 200 | 5 | ... |
| B | 200 | 7 | CU,vCU,... |
| C | 200 | 1 | vDU,... |
| D | 200 | 3 | ... |

| NUMBER OF FREE SERVERS | 8 |
|---|---|

FIG.13

| | | |
|---|---|---|
| INVENTORY KEY | | |
| BUNDLE ID | | |
| USER ID | | |
| PURCHASE SERVICE REQUIREMENT DATA | OPPOSITE IP | |
| | MONITORING TARGET | |
| | MONITORING INTERVAL | |
| | PASSWORD | |
| FUNCTIONAL UNIT CONFIGURATION DATA | CNF TYPE DATA | |
| | HOST NAME DATA | |
| | IP ADDRESS DATA | |
| | CONTAINER CONFIGURATION DATA | CONTAINER ID |
| | | CONTAINER IMAGE ID |
| | | REQUIRED RESOURCE DATA |
| | | RESOURCE POOL GROUP ID |
| | | RESOURCE POOL ID |
| | | CONNECTED CONTAINER ID LIST |

FIG.14

| INVENTORY KEY | 00100 |
|---|---|
| BUNDLE ID | 0010 |
| USER ID | 001 |

| OPPOSITE IP | 10.5.6.8 |
|---|---|
| MONITORING TARGET | ATTACH NUMBER |
| MONITORING INTERVAL | FIVE MINUTES |
| PASSWORD | ******* |

| CNF TYPE DATA | HOST NAME DATA | IP ADDRESS DATA | CONTAINER CONFIGURATION DATA | | | | |
|---|---|---|---|---|---|---|---|
| P-GW | PGW_xx_1 | 10.2.3.1 | ... | ... | ... | ... | ... |
| P-GW | PGW_xx_2 | 10.2.3.2 | ... | ... | ... | ... | ... |
| P-GW | PGW_xx_3 | 10.2.3.3 | ... | ... | ... | ... | ... |
| IMS | IMS_xx_1 | 10.2.3.4 | ... | ... | ... | ... | ... |
| IMS | IMS_xx_2 | 10.2.3.5 | ... | ... | ... | ... | ... |
| IMS | IMS_xx_3 | 10.2.3.6 | ... | ... | ... | ... | ... |
| HSS | HSS_xx_1 | 10.2.3.7 | ... | ... | ... | ... | ... |
| HSS | HSS_xx_2 | 10.2.3.8 | ... | ... | ... | ... | ... |
| HSS | HSS_xx_3 | 10.2.3.9 | ... | ... | ... | ... | ... |

FIG.15

| DATA CENTER NAME | ASSUMED BUSY LEVEL DATA |
|---|---|
| DATA CENTER A | 20,000 |
| DATA CENTER B | 10,000 |
| DATA CENTER C | 1,000 |
| | |

FIG.16

| | RESOURCE POOL GROUP ID | 100 | |
|---|---|---|---|

| RESOURCE POOL ID | TOTAL CORE NUMBER DATA | REMAINING CORE NUMBER DATA | CNF TYPE DATA |
|---|---|---|---|
| A | 200 | 5 | ... |
| B | 200 | 7 | CU,vCU,... |
| C | 250 | 46 | vDU,... |
| D | 200 | 3 | ... |

| NUMBER OF FREE SERVERS | 7 |
|---|---|

FIG.17

```
CNF PGW
  Pod1:
    container1:
      image: xxx
      CPU: xxx
      memory: xxx
      HDD: xxx
    container2:
      xxx Pod2: xxx Hostname:

```
CNF PGW
  Pod1:
    container1:
      image: xxx
      CPU: xxx
      memory: xxx
      HDD: xxx
    container2:
      xxx Pod2: xxx Hostname: PGW_xx_1

IP: 10.2.3.1
```

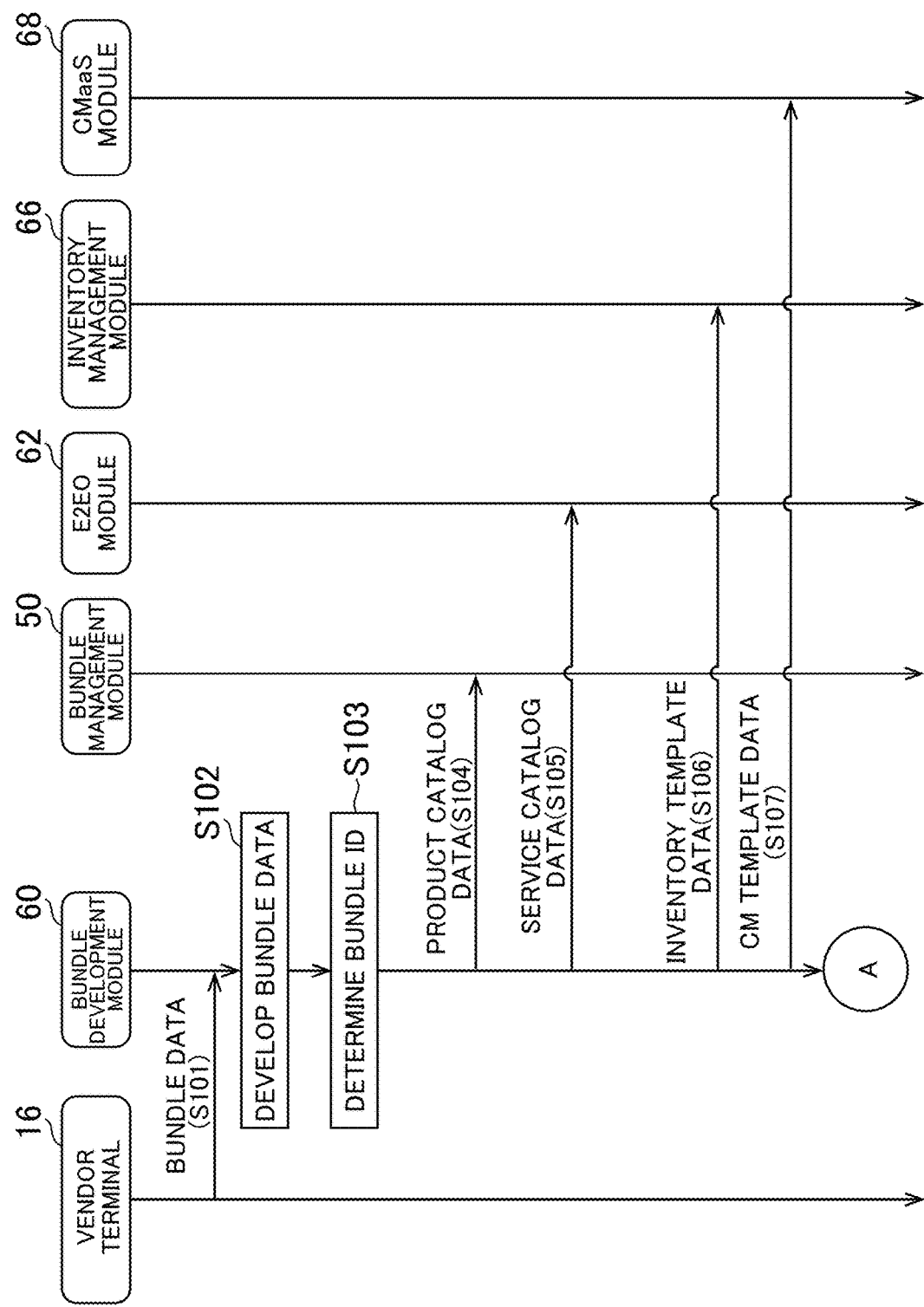

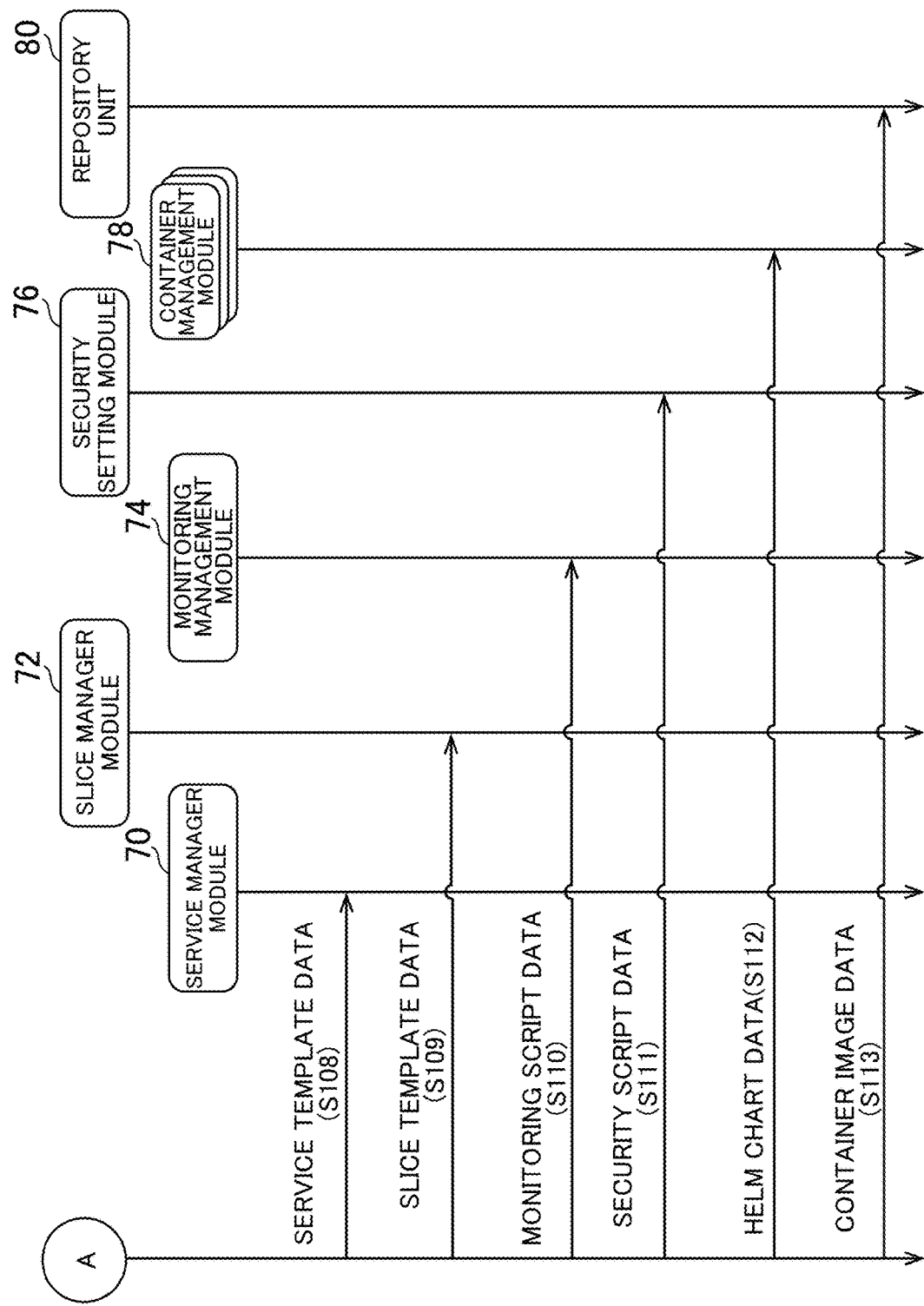

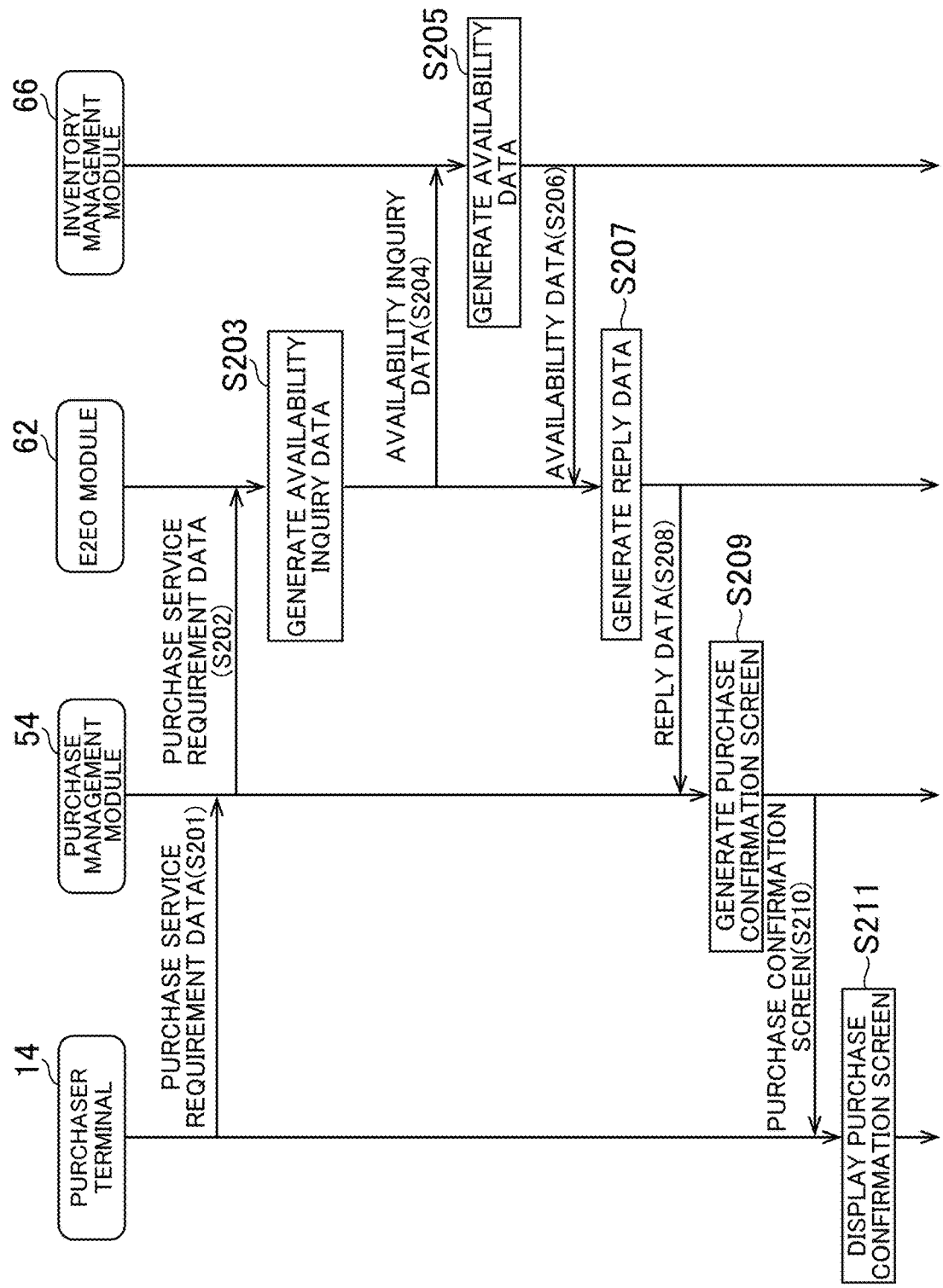

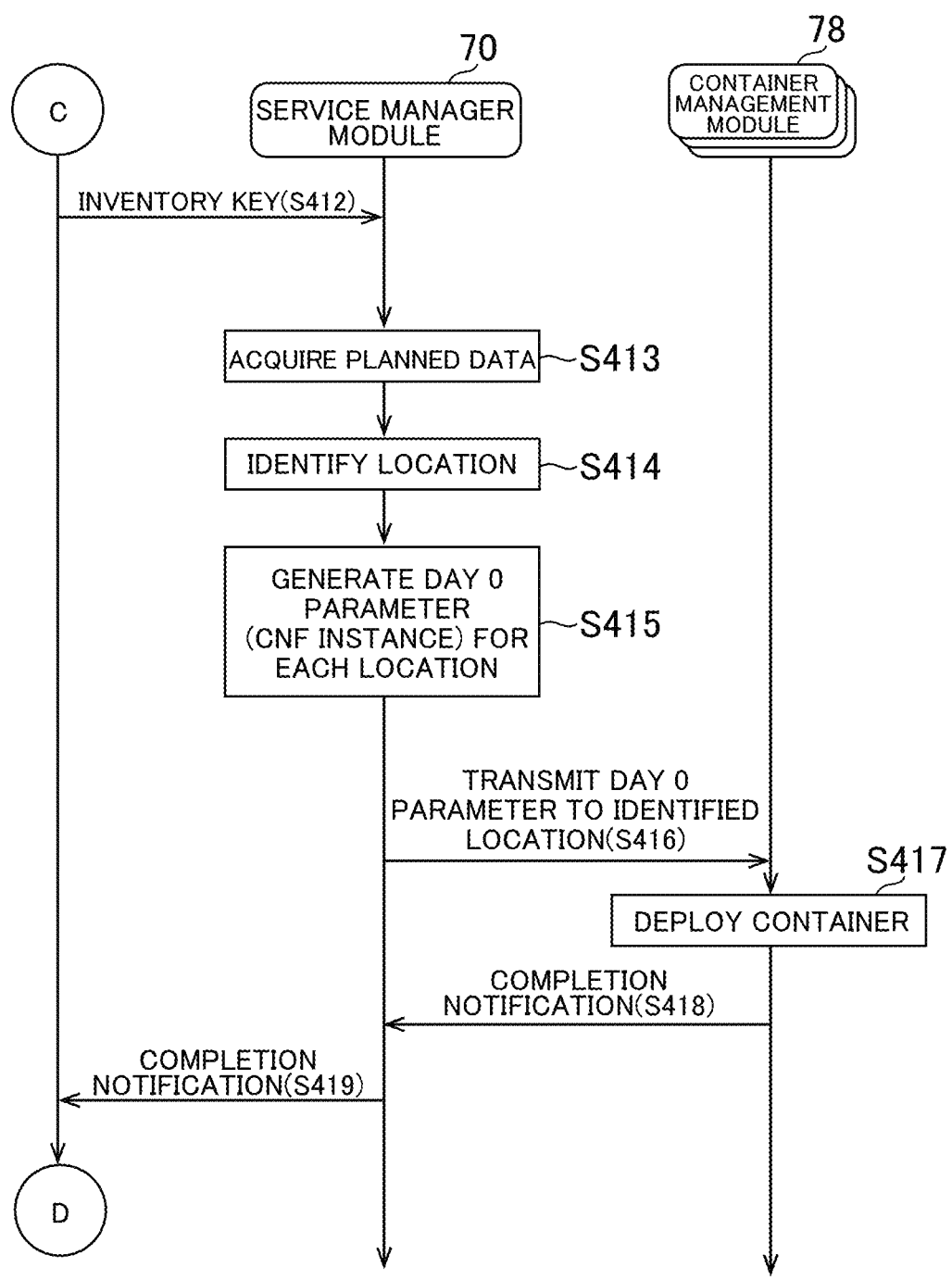

NETWORK SERVICE CONSTRUCTION SYSTEM AND NETWORK SERVICE CONSTRUCTION METHOD

RELATED APPLICATIONS

The present application is a National Phase of International Application No. PCT/IB2021/051565, filed Feb. 25, 2021, which claims priority to Japanese Patent Application No. 2020-031065, filed Feb. 26, 2020.

TECHNICAL FIELD

The present invention relates to a network service construction system and a network service construction method.

BACKGROUND ART

As an example of a technology relating to deployment of functional units in accordance with purchase of a network service, in Patent Literature 1, there is described a technology for deconstructing an order of a product purchased by a customer into virtualized network function (VNF) units and deploying the VNF units on a network functions virtualization infrastructure (NFVI).

In Patent Literature 2, there is described a technology for deploying a network function unit corresponding to a deployment request to an available computing device so as to satisfy an isolation requirement that is a requirement regarding non-sharing.

In Patent Literature 3, there is described a technology that allows a plurality of business operators to uniquely use all or a part of a plurality of network slices managed by a higher-level business operator.

CITATION LIST

Patent Literature

[Patent Literature 1] WO 2018/181826 A1
[Patent Literature 2] WO 2019/64678A1
[Patent Literature 3] WO 2018/34321 A1

SUMMARY OF INVENTION

Technical Problem

Needs for network services, such as network service configurations, scales, and target areas, are diverse. However, even with the use of the technologies described in Patent Literatures 1 to 3, it has not been possible to flexibly construct network services that satisfy various needs.

The present invention has been made in view of the above-mentioned circumstances, and has an object to provide a network service construction system and a network service construction method which are capable of flexibly constructing network services that satisfy various needs.

Solution to Problem

In order to solve the above-mentioned problem, according to one embodiment of the present invention, there is provided a network service construction system including: service requirement data receiving means for receiving service requirement data indicating a service requirement; configuration identification means for identifying, based on the service requirement data, a configuration of a functional unit group that achieves a network service; construction procedure identification means for identifying a construction procedure of the functional unit group based on the identified configuration and template data in which the configuration is acceptable as a parameter; and construction means for constructing the functional unit group by executing the identified construction procedure.

In one aspect of the present invention, the configuration identification means is configured to identify, based on the service requirement data, a location at which each of functional units included in the functional unit group is to be constructed, and the construction means is configured to construct each of the functional units included in the functional unit group at the location identified for the each of the functional unit.

As another example, the configuration identification means is configured to identify, based on the service requirement data, the number of functional unit groups to be constructed, and the construction means is configured to construct the identified number of functional unit groups.

As still another example, the configuration identification means is configured to identify, for each of a plurality of locations, a type and the number of functional units to be constructed at the each of the plurality of locations, based on the service requirement data, and the construction means is configured to construct, for each of the plurality of locations, an identified number of functional units of a type identified for the each of the plurality of locations.

In this aspect, the configuration identification means may be configured to determine, in accordance with a location identified based on the service requirement data, the number of functional units for each type to be constructed at the location.

Further, the configuration identification means may be configured to determine, based on a weight set for each of the locations, the number of functional units for each type to be constructed at the each of the locations.

Further, in one aspect of the present invention, the configuration identification means is configured to identify the configuration based on the service requirement data and inventory data indicating a status of a managed resource.

In this aspect, the configuration identification means may be configured to identify, based on the inventory data, at least one of a host name or an IP address of each of the functional units included in the functional unit group.

Further, the configuration identification means may be configured to identify, based on the inventory data, at least one of the host name or the IP address of each of the functional units so that at least one of the host name or the IP address is prevented from being the same as at least one of the host name or the IP address that is already being used.

As another example, the configuration identification means may be configured to identify at least one of the host name or the IP address of each of the functional units based on the location at which the each of the functional units is to be constructed.

Further, the network service construction system may further include notification means for notifying a purchaser of the network service of a turnaround time of the network service which is identified based on the inventory data.

Further, in one aspect of the present invention, the construction means is configured to execute, after the deployment of a new functional unit group, configuration management of the deployed functional unit group and at least one functional unit related to the functional unit group.

In this aspect, the construction means may be configured to execute, after the configuration management, configuration management related to instantiation of a network slice pertaining to the network service.

Further, in one aspect of the present invention, the construction procedure identification means is configured to generate a day 1 parameter indicating a configuration management procedure for a functional unit group to be deployed, the construction procedure identification means is configured to update the day 1 parameter based on a configuration management instruction related to instantiation of a network slice pertaining to the network service, and the construction means is configured to execute configuration management of at least one functional unit based on the day 1 parameter.

Further, in one aspect of the present invention, the construction procedure identification means is configured to generate a day 0 parameter indicating a deployment procedure of the functional unit group, and the construction means is configured to deploy the functional unit group based on the day 0 parameter.

Further, in one aspect of the present invention, the configuration identification means is configured to identify, based on the service requirement data, a monitoring policy of the functional unit group to be deployed, and the network service construction system further includes a monitoring management module configured to monitor, in accordance with the identified monitoring policy, the functional unit which is constructed.

In this aspect, the monitoring management module may be configured to deploy a sidecar linked to a monitoring target, and the sidecar may be configured to output, to the monitoring management module, a log which follows the monitoring policy.

Further, in one aspect of the present invention, the network service construction system further includes: a bundle file receiving means for receiving a bundle file generated by a vendor different from a purchaser of the network service; and a generating means for generating, based on the bundle file, requirement configuration correspondence data, which indicates a correspondence between a value of the service requirement data and the configuration of the functional unit group, and the template data, and the configuration identification means is configured to identify the configuration of the functional unit group based on the service requirement data received by the service requirement data receiving means and the requirement configuration correspondence data.

In this aspect, the bundle file may be a verified file created by the vendor by an onboarding process utilizing a CI/CD pipeline.

Further, in this aspect, the bundle file may include business section data indicating business requirements of the network service, technology section data indicating the configuration of a functional unit group that achieves the network service, security section data indicating a security definition of the network service, and operation section data indicating a monitoring policy regarding the network service.

Further, in one aspect of the present invention, the service requirement data receiving means is configured to receive a purchase request for the network service which is linked to the service requirement data.

Further, in one aspect of the present invention, functional units included in the functional unit group are implemented as containers.

According to one embodiment of the present invention, there is provided a network service construction method including the steps of: receiving service requirement data indicating a service requirement; identifying, based on the service requirement data, a configuration of a functional unit group that achieves a network service; identifying a construction procedure of the functional unit group based on the identified configuration and template data in which the configuration is acceptable as a parameter; and constructing the functional unit group by executing the identified construction procedure.

BRIEF DESCRIPTION OF DRAWINGS

FIG. 3 is a diagram for illustrating an example of a service requirement input screen.

FIG. 9 is a diagram for illustrating an example of data structure of a data group generated based on a bundle file.

FIG. 12 is a diagram for illustrating an example of resource management data.

FIG. 13 is a diagram for illustrating an example of data structure of planned data.

FIG. 14 is a diagram for schematically illustrating an example of planned data.

FIG. 15 is a diagram for illustrating an example of assumed busy level data.

FIG. 16 is a diagram for illustrating an example of resource management data.

FIG. 17 is a diagram for illustrating an example of CNFD.

FIG. 18 is a diagram for illustrating an example of a day 0 parameter.

FIG. 19A is a flowchart for illustrating an example of a flow of processes performed by a vendor terminal, an MPS, and an NOS in the one embodiment of the present invention.

FIG. 19B is a flowchart for illustrating an example of the flow of processes performed by the vendor terminal, the MPS, and the NOS in the one embodiment of the present invention.

FIG. 20 is a flowchart for illustrating an example of the flow of processes performed by a purchaser terminal, the MPS, and the NOS in the one embodiment of the present invention.

FIG. 22C is a flowchart for illustrating an example of the flow of processes performed by the NOS in the one embodiment of the present invention.

DESCRIPTION OF EMBODIMENTS

One embodiment of the present invention is now described in detail with reference to the drawings.

Figure 1:
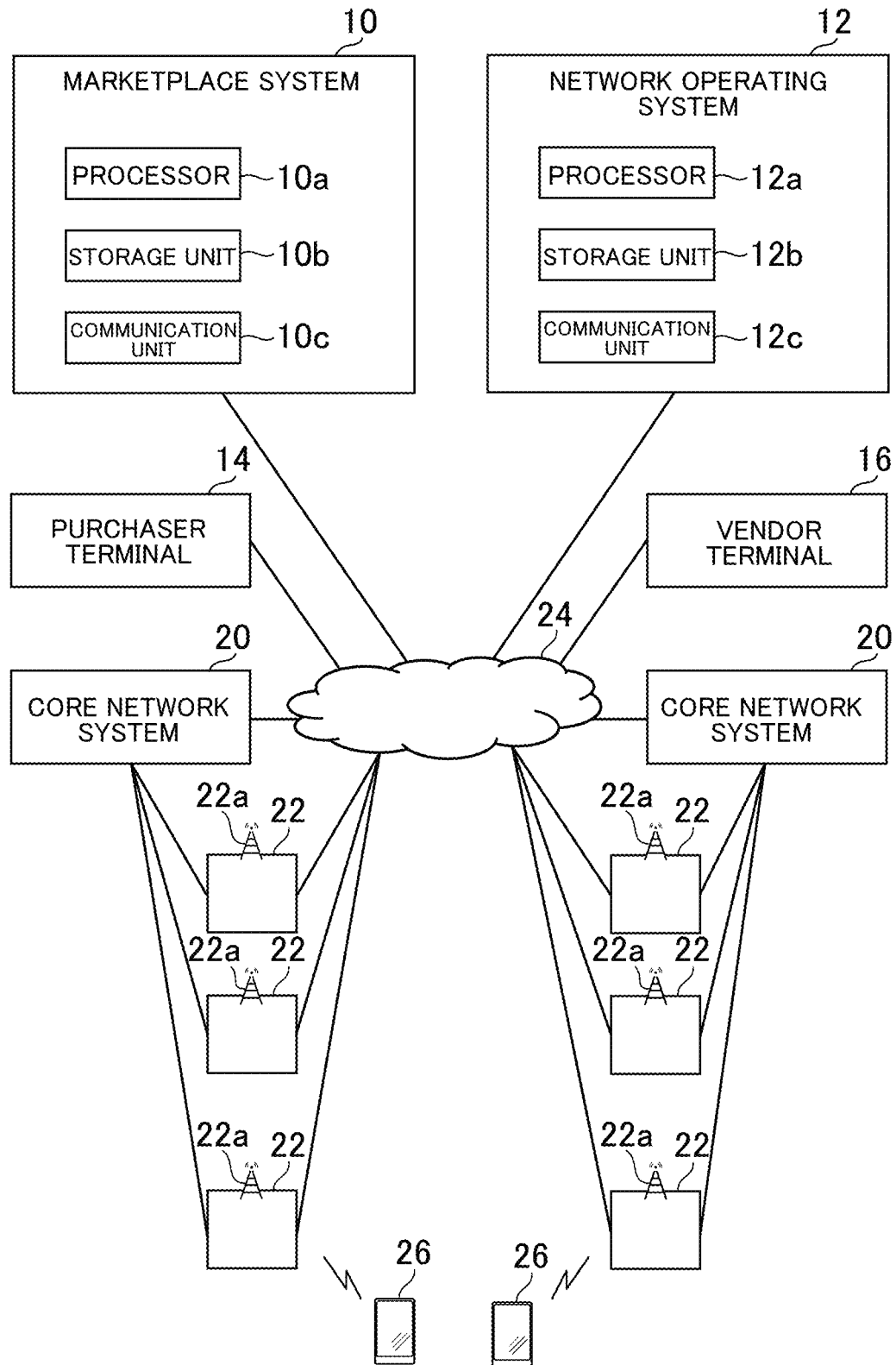
FIG. 1 is a diagram for illustrating an example of a computer network in one embodiment of the present invention.

FIG. 1 is a diagram for illustrating an example of a computer network 24 in the one embodiment of the present invention. As illustrated in FIG. 1, in this embodiment, a marketplace system (MPS) 10, a network operating system (NOS) 12, a purchaser terminal 14, a vendor terminal 16, a plurality of core network systems 20, and a plurality of base station apparatus 22 are connected to a computer network 24, for example, the Internet.

The core network system 20 is a system corresponding to an evolved packet core (EPC) in a fourth generation mobile communication system (hereinafter referred to as "4G") or a 5G core network (5GC) including an access and mobility management function (AMF), a session management function (SMF), a user plane function (UPF), and the like in a fifth generation mobile communication system (hereinafter referred to as "5G"). The core network system 20 in this embodiment is implemented by a group of servers arranged in a plurality of data centers provided at various locations. A plurality of servers are arranged in each data center. Although two core network systems 20 are illustrated in FIG. 1, the number of core network systems 20 in this embodiment is not limited to two, and may be one or three or more.

The base station apparatus 22 is a computer system corresponding to an eNodeB (eNB) in 4G and an NR base station (gNB) in 5G, and a computer system provided with an antenna 22a. The base station apparatus 22 in this embodiment includes one or a plurality of servers. The base station apparatus 22 may be implemented by a group of servers arranged in a data center.

Further, a virtual DU (vDU) and a virtual CU (vCU), which are components of a radio access network (RAN) in 4G, may be arranged in the base station apparatus 22 or may be incorporated in a part of the core network system 20. In the same manner, a DU and a CU, which are components of the RAN in 5G, may be arranged in the base station apparatus 22 or may be incorporated in a part of the core network system 20.

The MPS 10 in this embodiment is configured, for example, on a cloud platform and includes a processor 10a, a storage unit 10b, and a communication unit 10c, as illustrated in FIG. 1. The processor 10a is a program control device, for example, a microprocessor which operates in accordance with a program installed in the MPS 10. The storage unit 10b is, for example, a storage element such as a ROM or RAM, a solid state drive (SSD), a hard disk drive (HDD), or the like. The storage unit 10b stores a program to be executed by the processor 10a, and the like. The communication unit 10c is, for example, a communication interface such as a network interface card (NIC) or a wireless LAN module. The communication unit 10c transmits and receives data to/from the NOS 12 and the purchaser terminal 14 via the computer network 24.

The NOS 12 in this embodiment is configured, for example, on a cloud platform and includes a processor 12a, a storage unit 12b, and a communication unit 12c, as illustrated in FIG. 1. The processor 12a is a program control device, for example, a microprocessor which operates in accordance with a program installed in the NOS 12. The storage unit 12b is, for example, a storage element such as a ROM or RAM, a solid state drive (SSD), a hard disk drive (HDD), or the like. The storage unit 12b stores a program to be executed by the processor 12a, and the like. The communication unit 12c is, for example, a communication interface such as an NIC or a wireless LAN module. The communication unit 12c transmits and receives data to/from the MPS 10, the purchaser terminal 14, the vendor terminal 16, the core network system 20, and the base station apparatus 22 via the computer network 24.

In this embodiment, in response to a purchase request for a network service by a purchaser, the network service for which the purchase request has been made is constructed in the core network system 20 or the base station apparatus 22. Then, the constructed network service is provided to the purchaser.

For example, a network service such as a voice communication service, a data communication service, or the like is provided to the purchaser who is a mobile virtual network operator (MVNO). The voice communication service or the data communication service provided in this embodiment is eventually provided to a customer (end user) for the purchaser (MVNO in the above-mentioned example), who uses a user equipment (UE) 26 illustrated in FIG. 1. The end user can perform voice communication or data communication to/from other users via the core network system 20 or the base station apparatus 22.

Further, the network service provided in this embodiment is not limited to a voice communication service and a data communication service. The network service provided in this embodiment may be, for example, an IoT service. Then, for example, an end user who uses a robot arm, a connected car, or the like may be a purchaser of the network service in this embodiment.

Further, in this embodiment, a container type application execution environment, for example, Docker, is installed in the servers arranged in the core network system 20 and the base station apparatus 22, and containers can be deployed in those servers and operated. The network service provided to the purchaser in this embodiment is implemented by a cloud-native network function (CNF)), which is a container-based functional unit.

The purchaser terminal 14 in this embodiment is, for example, a general computer used by the purchaser described above, such as a smartphone, a tablet terminal, or a personal computer.

Figure 2:
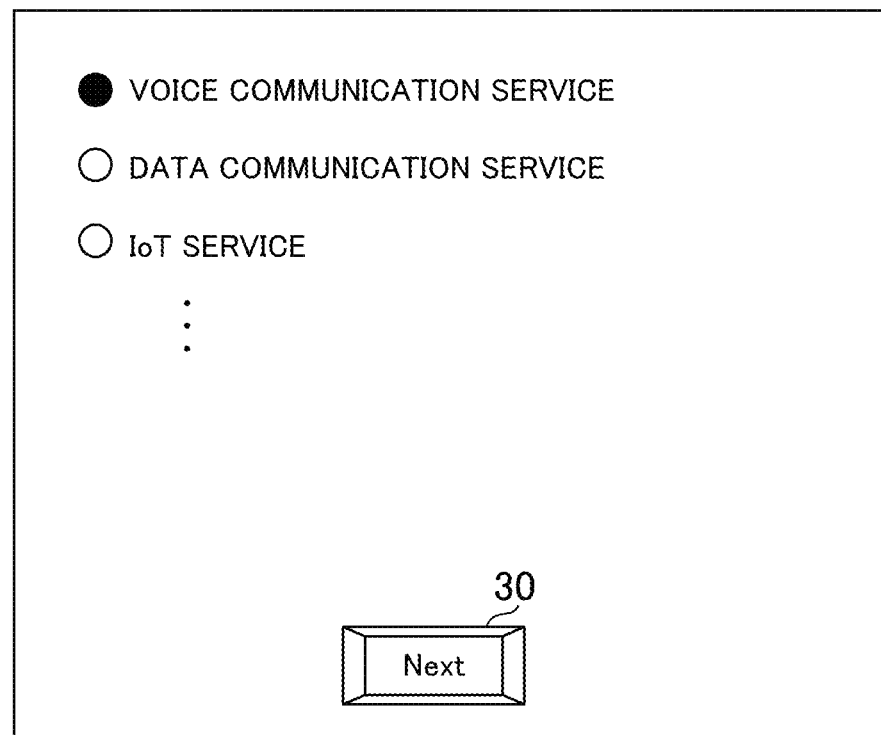
FIG. 2 is a diagram for schematically illustrating an example of a purchase screen.

FIG. 2 is a diagram for illustrating an example of a purchase screen displayed on the purchaser terminal 14 in this embodiment. On the purchase screen illustrated in FIG. 2, a type of network service to be purchased by the purchaser can be selected with a radio button. Here, when the purchaser specifies a voice communication service and clicks a "NEXT" button 30, the purchaser terminal 14 displays the service requirement input screen illustrated in FIG. 3.

On the service requirement input screen, the purchaser can enter service requirements for the network service to be purchased by the purchaser. In the example of FIG. 3, the number of subscribers, an opposite IP, a monitoring target, a monitoring interval, a target area, and a password can be set. The "opposite IP" refers to an IP address serving as an access point for the network system already possessed by the purchaser.

When the purchaser enters those service requirements and clicks the "NEXT" button 32, service requirement data associated with the input onto the service requirement input screen is transmitted to the MPS 10.

The service requirement data includes, for example, the subscriber number data indicating the number of subscribers, opposite IP data indicating the opposite IP, monitoring target data indicating the monitoring target, monitoring interval data indicating the monitoring interval of the monitoring target, target area data indicating the target area of the network service to be purchased, and password data indicating the password. The service requirement data is not required to include all of those pieces of data, and may include data indicating requirements other than those requirements.

Then, based on the service requirement data, the MPS 10 cooperates with the NOS 12 to confirm whether or not it is possible to secure a server that satisfies the service requirements indicated by the service requirement data. For example, in this case, the MPS 10 determines whether (1) it is possible to secure a server that satisfies the service requirements, (2) it is possible to secure a server that satisfies the service requirements by setting up a free server, or (3) it is impossible to secure a server that satisfies the service requirements.

Figure 4:
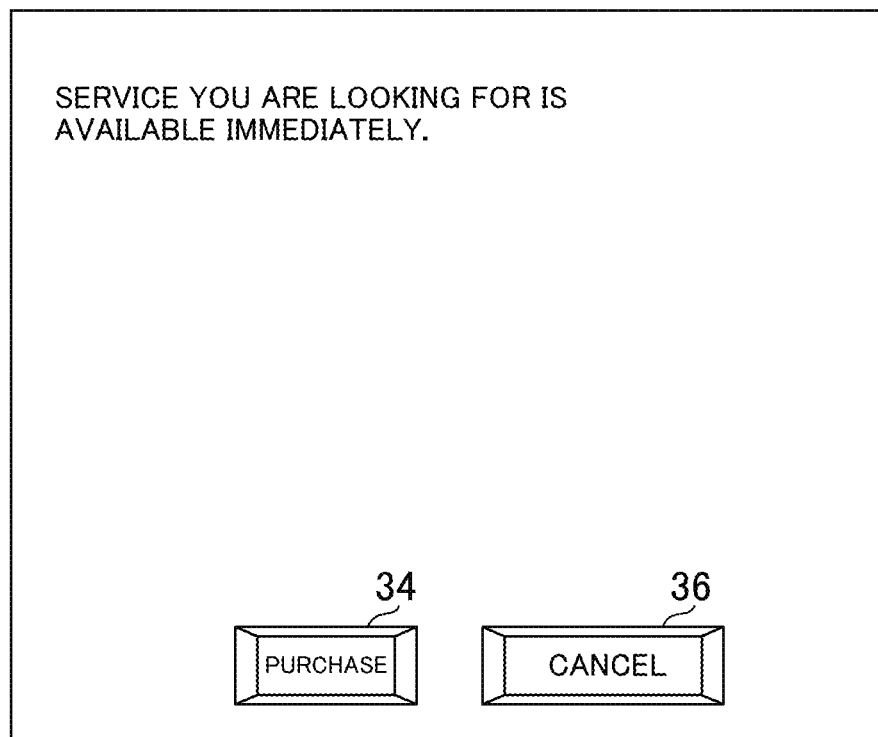
FIG. 4 is a diagram for illustrating an example of a purchase confirmation screen.

When a result of the determination is "(1)" or "(2)", the purchaser terminal 14 displays a purchase confirmation screen illustrated in FIG. 4 that indicates that the service can be immediately provided. When the result of the determination is "(3)", the purchaser terminal 14 displays a purchase confirmation screen illustrated in FIG. 5 that indicates that a predetermined turnaround time is required (for example, a turnaround time of 2 weeks is required).

Figure 5:
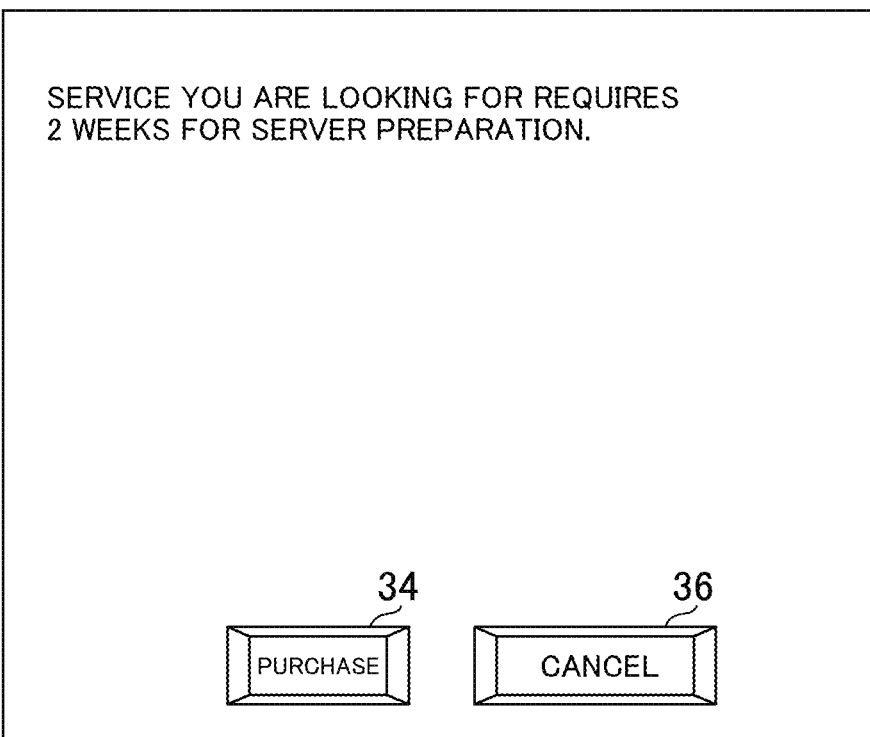
FIG. 5 is a diagram for illustrating an example of the purchase confirmation screen.

When the purchaser clicks a "PURCHASE" button 34 illustrated in FIG. 4 or FIG. 5, a network service for which the purchase request has been made is constructed and provided to the purchaser.

Meanwhile, when the purchaser clicks a "CANCEL" button 36 illustrated in FIG. 4 or FIG. 5, the purchase is canceled.

As described above, according to this embodiment, a network service that satisfies various purchaser's needs is flexibly constructed. Without being aware of the detailed implementation of the network service, the purchaser can receive the provision of a desired network service by only specifying some service requirements.

The vendor terminal 16 in this embodiment is a general computer used by a vendor, for example, a service provider related to the network service, such as a smartphone, a tablet terminal, a personal computer, or the like.

In this embodiment, the vendor is provided with a continuous integration (CI)/continuous delivery (CD) pipeline including a development environment, a verification environment, and a test environment. In this embodiment, a verified bundle file corresponding to the network service to be provided to the purchaser, which is created by the vendor, is on-boarded by an onboarding process utilizing the CI/CD pipeline.

The bundle file in this embodiment is, for example, a file obtained by compressing a file group having a predetermined directory structure (for example, a file having tar.gz format).

Figure 6:
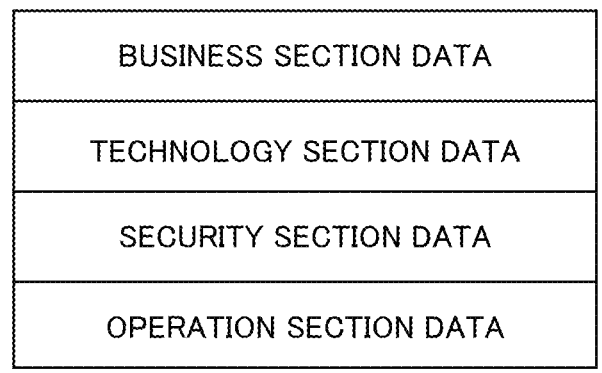
FIG. 6 is a diagram for illustrating an example of data structure of a bundle file.

FIG. 6 is a diagram for illustrating an example of data structure of the bundle file in this embodiment. As illustrated in FIG. 6, the bundle file in this embodiment includes business section data, technology section data, security section data, and operation section data.

The business section data shows business requirements of the network service such as the name of the network service, license requirements, and the definition of service level agreement (SLA). Further, the business section data in this embodiment includes data indicating mandatory input items and optional input items for the service requirements of the network service.

The technology section data shows, for example, the configuration of a functional unit group that achieves the network service. The technology section data shows, for example, the configurations of applications and CNFs that form the network service.

The security section data shows, for example, the security definition of the network service, for example, installation credentials.

The operation section data shows, for example, the monitoring policy regarding the network service, such as monitoring target metrics and monitoring intervals.

Figure 7:
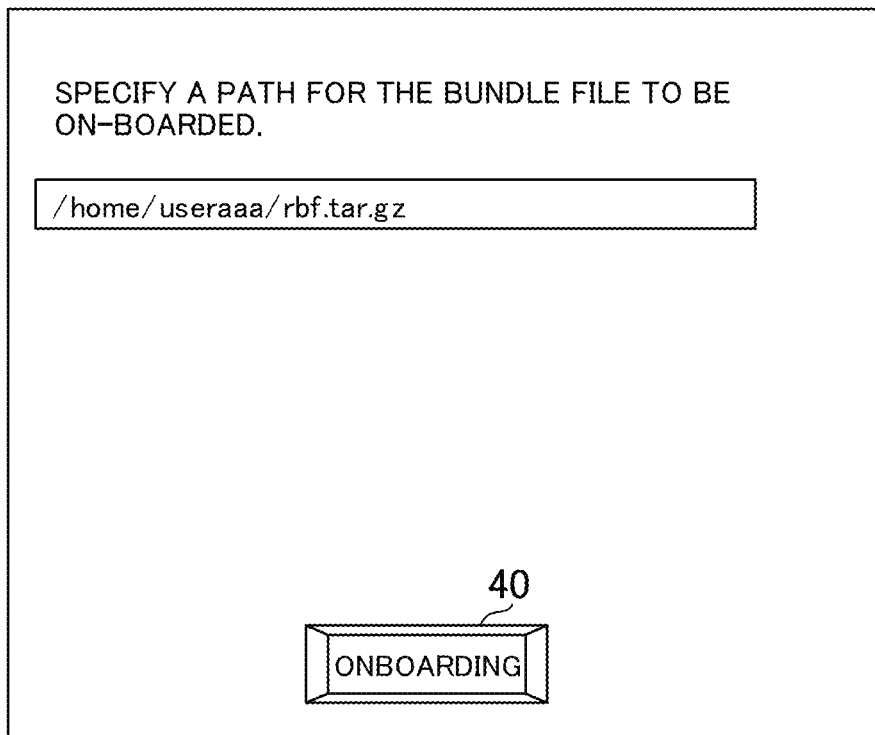
FIG. 7 is a diagram for illustrating an example of an onboarding screen.

FIG. 7 is a diagram for illustrating an example of an onboarding screen displayed on the vendor terminal 16 in this embodiment. In this embodiment, when the vendor specifies a path in which the bundle file is arranged and then clicks an "ONBOARDING" button 40, the bundle file becomes on-boarded.

As described above, in this embodiment, the vendor can easily perform onboarding of the network service without being aware of the actual location at which a developed file group is on-boarded.

The functions of the MPS 10 and the NOS 12 in this embodiment and processes to be executed by the MPS 10 and the NOS 12 are further described in the following.

Figure 8:
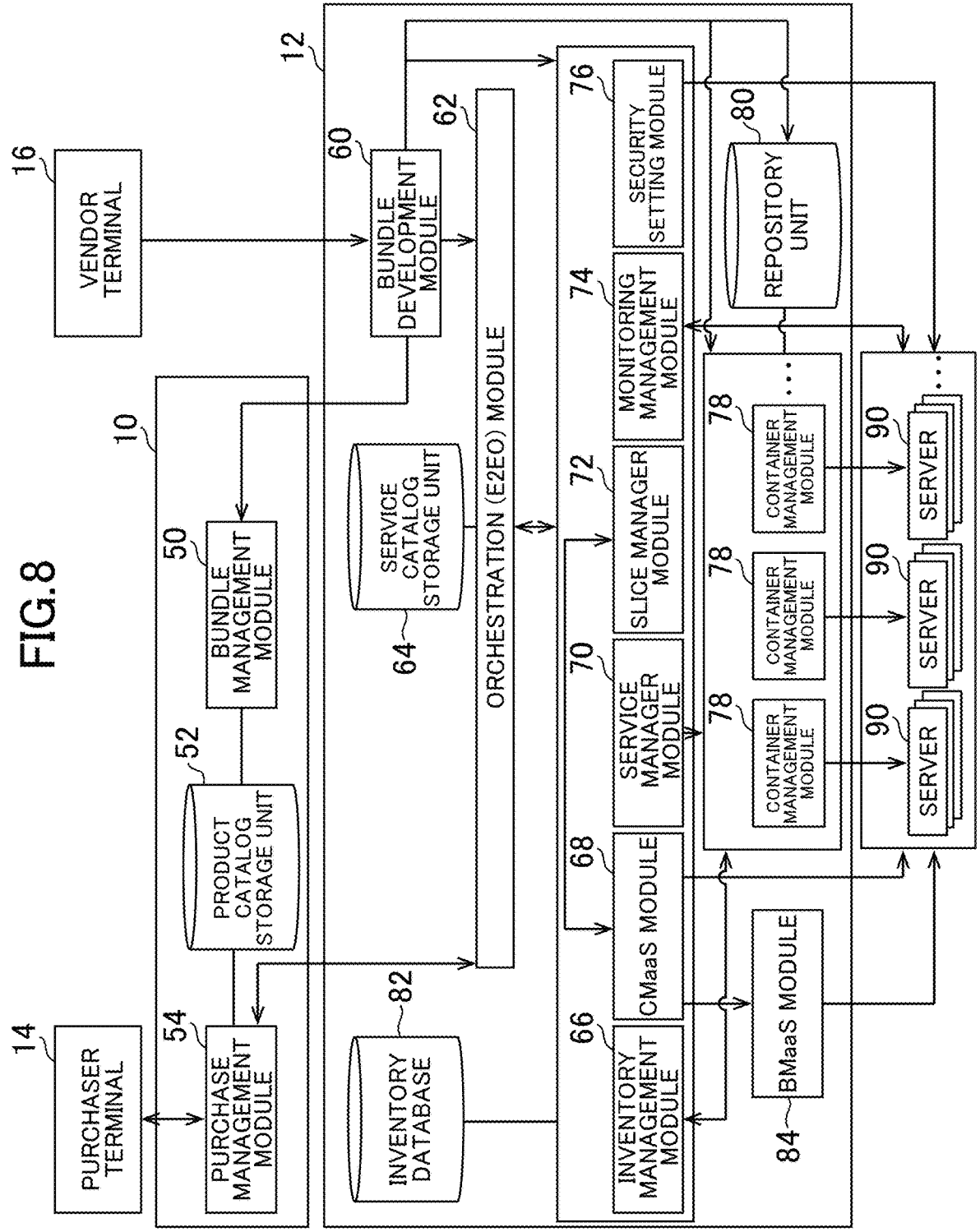
FIG. 8 is a functional block diagram for illustrating an example of functions implemented by an MPS and an NOS in the one embodiment of the present invention.

FIG. 8 is a functional block diagram for illustrating an example of functions implemented by the MPS 10 and the NOS 12 in this embodiment. The MPS 10 and the NOS 12 in this embodiment are not required to implement all of the functions illustrated in FIG. 8 and may implement functions other than those illustrated in FIG. 8.

As illustrated in FIG. 8, the MPS 10 functionally includes, for example, a bundle management module 50, a product catalog storage unit 52, and a purchase management module 54.

The bundle management module 50 and the purchase management module 54 are implemented mainly by the processor 10a and the communication unit 10c. The product catalog storage unit 52 is implemented mainly by the storage unit 10b.

The above-mentioned functions may be implemented by executing, by the processor 10a, a program that is installed in the MPS 10, which is a computer, and that includes instructions corresponding to the above-mentioned functions. This program may be supplied to the MPS 10 via a computer-readable information storage medium such as an optical disc, a magnetic disk, a magnetic tape, a magneto-optical disc, a flash memory, or the like, or via the Internet or the like.

Further, as illustrated in FIG. 8, the NOS 12 functionally includes, for example, a bundle development module 60, an orchestration (E2EO: End-to-End-Orchestration) module 62, a service catalog storage unit 64, an inventory management module 66, a Configuration Management as a Service (CMaaS) module 68, a service manager module 70, a slice manager module 72, a monitoring management module 74, a security setting module 76, a plurality of container management modules 78, a repository unit 80, an inventory database 82, and a Bare Metal as a Service (BMaaS) module 84.

The bundle development module 60 and the E2EO module 62 are implemented mainly by the processor 12a and the communication unit 12c. The service catalog storage unit 64, the repository unit 80, and the inventory database 82 are implemented mainly by the storage unit 12b. The inventory management module 66, the CMaaS module 68, the service manager module 70, the slice manager module 72, the monitoring management module 74, the security setting module 76, and the container management modules 78 are implemented mainly by the processor 12a and the storage unit 12b. The BMaaS module 84 is implemented mainly by the processor 12a.

The above-mentioned functions may be implemented by executing, by the processor 12a, a program that is installed in the NOS 12, which is a computer, and that includes instructions corresponding to the above-mentioned functions. This program may be supplied to the NOS 12 via a computer-readable information storage medium such as an optical disc, a magnetic disk, a magnetic tape, a magneto-optical disc, a flash memory, or the like, or via the Internet or the like.

Further, FIG. 8 also shows a plurality of servers 90 included in the core network systems 20 and the base station apparatus 22 illustrated in FIG. 1 and distributed and arranged at various locations. Each of the plurality of container management modules 78 in this embodiment is associated with a server group that is a part of the plurality of servers 90.

In each of the plurality of container management modules 78 in this embodiment, for example, a container management tool such as Kubernetes, and a package manager such as Helm are installed. The container management module 78 executes life cycle management of a container including the construction of the container such as the deployment and setting of the container for a server group (a plurality of servers 90) associated with the container management module 78.

The container management module 78 is not required to be included in the NOS 12. The container management module 78 may be provided in, for example, a server 90 (that is, the core network system 20 or the base station apparatus 22) managed by the container management module 78, or a server that is annexed to the server 90.

For example, in this embodiment, the bundle development module 60 receives a bundle file from the vendor terminal 16. Then, for example, in this embodiment, the bundle development module 60 generates a data group having data structure illustrated in FIG. 9, based on the received bundle file. The data group illustrated in FIG. 9 is obtained by reconstructing the contents of the bundle file received by the bundle development module 60.

As illustrated in FIG. 9, the data group generated by the bundle development module 60 includes product catalog data, service catalog data, inventory template data, CM template data, service template data, slice template data, monitoring script data, security script data, Helm chart data, and container image data.

The product catalog data is, for example, data corresponding to business section data included in a bundle file. As described above, the product catalog data shows information regarding business requirements of the network service, such as the name of the network service displayed on the purchase screen illustrated in FIG. 2, license requirements, and the definition of the service level agreement (SLA).

Further, the product catalog data in this embodiment includes data indicating mandatory input items and optional input items for the service requirements of the network service. In this embodiment, for example, the purchase screen illustrated in FIG. 2 and the service requirement input screen illustrated in FIG. 3 are generated based on the product catalog data.

The service catalog data is, for example, data corresponding to a part of the technology section data included in the bundle file. The service catalog data contains a workflow script for constructing the network service.

Further, the service catalog data may include requirement configuration correspondence data indicating the correspondence between a value of the above-mentioned service requirement data and the configuration of a functional unit group (for example, CNF group) constructed in response to a purchase request.

For example, the service catalog data may include requirement configuration correspondence data indicating the correspondence between the value of the service requirement data, the type of a functional unit group, and the number of functional units for each type. For example, the requirement configuration correspondence data may show that "20,000 subscribers correspond to one packet data network gateway (P-GW)," "20,000 subscribers correspond to one IP multimedia system (IMS)," and "20,000 subscribers correspond to one home subscriber server (HSS)". What is associated with the service requirement data is not limited to the type and the number of 4G components, and the service requirement data and the type and the number of 5G components may be associated with each other.

Further, for example, the requirement configuration correspondence data may indicate the correspondence between the value of the service requirement data and a location at which each functional unit included in a functional unit group constructed in response to a purchase request is to be constructed. In this case, the location associated with the value of the service requirement data in the requirement configuration correspondence data may be different depending on functional units included in the functional unit group to be constructed.

The inventory template data is, for example, data corresponding to a part of the technology section data and a part of the security section data included in the bundle file. The inventory template data is, for example, template data indicating the logic used by the inventory management module 66.

The CM template data is, for example, data corresponding to a part of the technology section data and a part of the operation section data included in the bundle file, and is, for example, template data indicating the logic used by the CMaaS module 68.

The service template data is, for example, data corresponding to a part of the technology section data included in the bundle file, and is, for example, template data indicating the logic used by the service manager module 70.

The slice template data is, for example, data corresponding to a part of the technology section data included in the bundle file, and is, for example, template data indicating the logic used by the slice manager module 72.

The monitoring script data is, for example, data corresponding to a part of the operation section data included in the bundle file, and is, for example, data indicating a monitoring script executed by the monitoring management module 74.

The security script data is, for example, data corresponding to a part of the security section data included in the bundle file, and is, for example, data indicating a script regarding security executed by the security setting module 76.

The Helm chart data is, for example, data corresponding to a part of the operation section data included in the bundle file, and is data indicating a script template (Helm chart) used by the container management module 78.

The container image data is, for example, data corresponding to a part of the operation section data included in the bundle file, and is, for example, container image data of a container included in the functional unit group that achieves the network service. The container image data includes one or a plurality of container images. A container image ID, which is an identifier of the container image, is linked to each of the one or the plurality of container images.

In this embodiment, in response to the reception of a bundle file, the bundle development module 60 determines a bundle ID that corresponds to a data group generated based on the bundle file. A bundle ID is uniquely assigned to each generated data group.

Then, the bundle development module 60 links the product catalog data included in the data group corresponding to the bundle ID to the determined bundle ID, and then transmits the product catalog data to the MPS 10.

Further, the bundle development module 60 outputs the service catalog data included in the data group to the E2EO module 62 after linking the service catalog data to the determined bundle ID. Then, the E2EO module 62 stores the service catalog data in the service catalog storage unit 64.

Further, the bundle development module 60 links the inventory template data, the CM template data, the service template data, the slice template data, the monitoring script data, the security script data, the Helm chart data, and the container image data to the bundle ID corresponding to the data group, and then stores the pieces of data in the inventory management module 66, the CMaaS module 68, the service manager module 70, the slice manager module 72, the monitoring management module 74, the security setting module 76, the container management module 78, and the repository unit 80, respectively.

As described above, in this embodiment, the product catalog data, the service catalog data, the inventory template data, the CM template data, the service template data, the slice template data, the monitoring script data, the security script data, the Helm chart data, and the container image data become linked to one another by the bundle ID.

Further, in this embodiment, the vendor can easily provide the network service by a simple operation of, for example, specifying a path of the bundle file.

In this embodiment, for example, the bundle management module 50 receives the product catalog data linked to the bundle ID transmitted from the bundle development module 60. Then, the bundle management module 50 stores the received product catalog data in the product catalog storage unit 52.

In this embodiment, for example, the product catalog storage unit 52 stores the product catalog data linked to the bundle ID as described above.

In this embodiment, for example, the purchase management module 54 receives from the purchaser terminal 14 a network service construction request, such as a purchase request for a network service, which is linked to the bundle ID and the service requirement data. A bundle ID linked to a purchase request is hereinafter referred to as "purchase bundle ID," and service requirement data linked to a purchase request is hereinafter referred to as "purchase service requirement data."

Then, the purchase management module 54 transmits the purchase service requirement data linked to the purchase bundle ID to the E2EO module 62 in response to the reception of the purchase request described above.

Further, in cooperation with the E2EO module 62 and the inventory management module 66, the purchase management module 54 identifies the turnaround time of the network service purchased by the purchaser. Then, the purchase management module 54 notifies the purchaser of the identified turnaround time. The purchase management module 54 generates, for example, a purchase confirmation screen indicating the identified turnaround time, and transmits the generated purchase confirmation screen to the purchaser terminal 14.

In this embodiment, the inventory database 82 is, for example, a database in which inventory information for a plurality of servers 90 managed by the NOS 12 and arranged in the core network system 20 and the base station apparatus 22 is stored.

Figure 10:
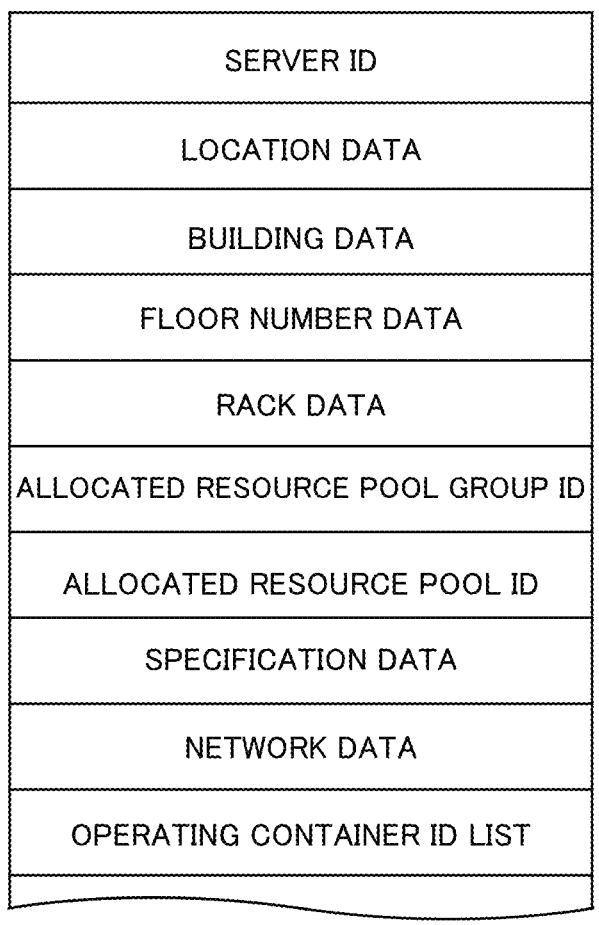
FIG. 10 is a diagram for illustrating an example of data structure of physical inventory data.
Figure 11:
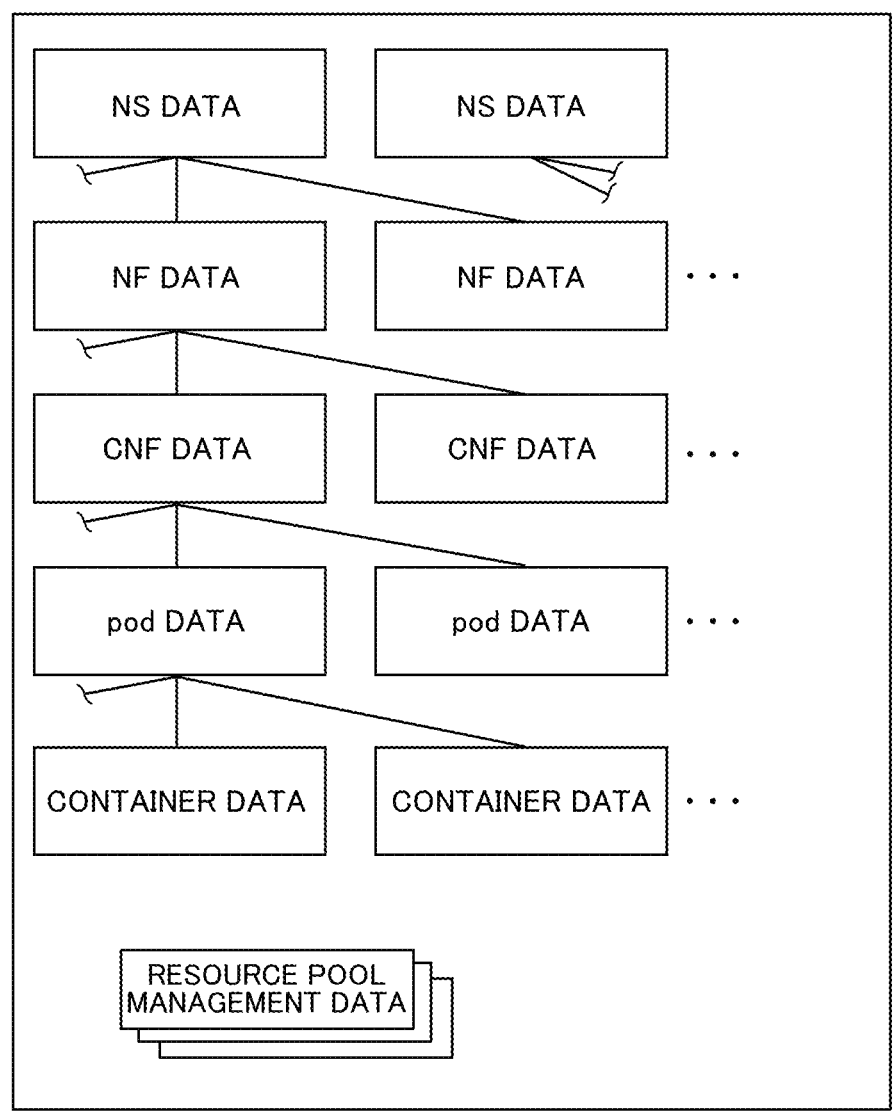
FIG. 11 is a diagram for schematically illustrating an example of data structure of logical inventory data.

In this embodiment, for example, the inventory database 82 stores inventory data including the physical inventory data illustrated in FIG. 10 and the logical inventory data illustrated in FIG. 11. The inventory data shows the status of resources managed by the NOS 12 (for example, resource usage status).

FIG. 10 is a diagram for illustrating an example of the data structure of the physical inventory data. The physical inventory data illustrated in FIG. 10 is associated with one server 90. The physical inventory data illustrated in FIG. 10 includes, for example, a server ID, location data, building data, floor number data, rack data, an allocated resource pool group ID, an allocated resource pool ID, specification data, network data, and operating container ID list.

The server ID included in the physical inventory data is, for example, an identifier of the server 90 associated with the physical inventory data.

Location data included in the physical inventory data is, for example, data indicating the location of the server 90 (for example, the address of the location) associated with the physical inventory data.

Building data included in the physical inventory data is, for example, data indicating a building (for example, a building name) in which the server 90 associated with the physical inventory data is arranged.

Floor number data included in the physical inventory data is, for example, data indicating a floor number at which the server 90 associated with the physical inventory data is arranged.

Rack data included in the physical inventory data is, for example, an identifier of a rack in which the server 90 associated with the physical inventory data is arranged.

An allocated resource pool group ID included in the physical inventory data is, for example, an identifier of a resource pool group to which the server 90 associated with the physical inventory data is allocated.

An allocated resource pool ID included in the physical inventory data is, for example, an identifier of a resource pool to which the server 90 associated with the physical inventory data is allocated. A resource pool indicated by the allocated resource pool ID is any resource pool included in a resource pool group corresponding to the allocated resource pool group ID. In this embodiment, a free server is assigned to any resource pool group. However, it is undetermined to which resource pool included in the resource pool group the free server is assigned. For such a free server, "Null" is set as the value of the allocated resource pool ID included in the corresponding physical inventory data.

The specification data included in the physical inventory data is data indicating the specifications of the server 90, such as the number of cores, the memory capacity, and the hard disk capacity, of the server 90 associated with the physical inventory data.

The network data included in the physical inventory data is, for example, data indicating an NIC included in the server 90 associated with the physical inventory data, the number of ports included in the NIC, and the like.

The operating container ID list included in the physical inventory data is, for example, data indicating a list of identifiers (container IDs) of one or a plurality of container instances operating in the server 90 associated with the physical inventory data.

FIG. 11 is a diagram for schematically illustrating an example of the data structure of logical inventory data. As illustrated in FIG. 11, the logical inventory data includes network service (NS) data, network function (NF) data, CNF data, pod data, and container data.

The NS data is, for example, data indicating attributes such as an identifier of an instance of a network service corresponding to virtual RAN (vRAN) and the type of the network service. The NF data is, for example, data indicating attributes such as an identifier of an instance of a network function corresponding to eNodeB or the like and the type of the network function. The CNF data is, for example, data indicating attributes such as an identifier of an instance of CNF that corresponds to vCU, vDU, or the like and the type of the CNF. The pod data is data indicating attributes such as the identifier of an instance of a pod included in the CNF and the type of the pod. The "pod" refers to a minimum unit for managing a Docker container by Kubernetes. The container data is data indicating attributes such as the container ID of an instance of a container included in the pod and the type of the container.

Data indicating attributes such as the host name and the IP address may be set in the above-mentioned data included in the logical inventory data. For example, the container data may include data indicating the IP address of a container corresponding to the container data. Further, for example, the CNF data may include data indicating the IP address and the host name of a CNF indicated by the CNF data.

The above-mentioned data has a hierarchical structure, and the NS data is linked to one or a plurality of pieces of NF data respectively corresponding to one or a plurality of network functions included in a network service corresponding to the NS data. Further, the NF data is linked to one or a plurality of pieces of CNF data respectively corresponding to one or a plurality of CNFs included in a network function corresponding to the NF data. Further, the CNF data is linked to one or a plurality of pieces of pod data respectively corresponding to one or a plurality of pods included in a CNF corresponding to the CNF data. Further, the pod data is linked to one or a plurality of pieces of container data respectively corresponding to one or a plurality of containers included in a pod corresponding to the pod data.

With the container ID of the container data included in the logical inventory data and the container ID included in the operating container ID list included in the physical inventory data, an instance of the container and the server 90 on which the instance of the container is operating become linked to each other.

In this embodiment, a network service to be purchased by the purchaser (a network service associated with product catalog data) is not required to correspond to a network service associated with the NS data. For example, the network service to be purchased by the purchaser may be achieved by a functional unit group corresponding to a network function associated with one or a plurality of pieces of NF data, or may be achieved by a functional unit group associated with one or a plurality of pieces of CNF data. Further, the network service to be purchased by the purchaser may be achieved by a functional unit group associated with one or a plurality of pods, or may be achieved by a functional unit group associated with one or a plurality of containers.

Further, as illustrated in FIG. 11, the logical inventory data in this embodiment includes a plurality of pieces of resource pool management data that are associated with respective resource pool groups.

FIG. 12 is a diagram for illustrating an example of resource pool management data in this embodiment. The resource pool management data indicates the statuses of a plurality of resource pools included in a resource pool group associated with the resource pool management data.

The resource pool management data illustrated in FIG. 12 includes a resource pool group ID, a plurality of pieces of resource pool data, and free server number data.

The resource pool group ID included in the resource pool management data is an identifier of a resource pool group associated with the resource pool management data.

The free server number data included in the resource pool management data is data indicating the number of free servers allocated to the resource pool group associated with the resource pool management data.

The resource pool data is data indicating the statuses of resource pools included in a resource pool group associated with the resource pool management data.

As illustrated in FIG. 12, the resource pool data includes a resource pool ID, total core number data, remaining core number data, and CNF type data.

The resource pool ID is an identifier of a resource pool.

The total core number data is data indicating the total number of cores of a server 90 allocated to the resource pool. The total core number data is a specific example of resource total amount data indicating the total amount of hardware resources included in the resource pool.

The remaining core number data is data indicating the number of remaining cores of the server 90 allocated to the resource pool. The remaining core number data is a specific example of resource remaining amount data indicating the remaining amount of the hardware resources included in the resource pool.

The CNF type data is data indicating one or more types of CNFs linked to the resource pool. The CNF type data is a specific example of functional unit type data indicating one or more types of functional units linked to the resource pool.

In this embodiment, a resource pool group that spans a plurality of locations may be preset, or a resource pool group that is associated with only one location may be preset. In any case, the resource pool group is associated with one or a plurality of locations indicated by the physical inventory data.

Further, the inventory management module 66 can appropriately grasp the resource status in cooperation with the container management module 78. Then, the inventory management module 66 appropriately updates the inventory data stored in the inventory database 82 based on the latest resource status.

In this embodiment, the E2EO module 62 and the inventory management module 66 identify the configuration of a functional unit group that achieves a network service to be purchased, for example, based on the service requirement data received from the purchase management module 54.

For example, the E2EO module 62 acquires, from the service catalog storage unit 64, service catalog data corresponding to a purchase bundle ID linked to the purchase service requirement data received from the purchase management module 54. The E2EO module 62 executes a workflow script indicated by the service catalog data.

The E2EO module 62 and the inventory management module 66 generate planned data illustrated as an example in FIG. 13 and FIG. 14 based on the purchase service requirement data received from the purchase management module 54, the service catalog data linked to the purchase bundle ID, the inventory template data linked to the purchase bundle ID, and the inventory data. The planned data is, for example, data indicating the configuration of a functional unit group that achieves a network service to be purchased. This process is executed, for example, with the execution of the workflow script by the E2EO module 62 as a trigger.

FIG. 13 is a diagram for illustrating an example of the data structure of planned data in this embodiment. FIG. 14 is a diagram for schematically illustrating an example of the planned data in this embodiment. The planned data in this embodiment includes an inventory key being an identifier of the planned data. The inventory key is uniquely assigned to the planned data when the planned data is generated. Further, the planned data includes a purchase bundle ID ("0010" in the example of FIG. 14). In addition, the planned data includes a user ID being an identifier of the purchaser (user) who has made a purchase request.

Further, the planned data may include a value that is set to the purchase service requirement data. The planned data illustrated in FIG. 13 and FIG. 14 includes the value of opposite IP data, the value of monitoring target data, the value of monitoring interval data, and the value of password data included in the purchase service requirement data.

In this embodiment, the planned data includes functional unit configuration data for each of functional units included in the functional unit group that achieves the network service to be purchased. The functional unit configuration data includes, for example, CNF type data indicating the type of the functional unit, host name data indicating the host name, IP address data indicating the IP address, and a plurality of pieces of container configuration data associated with respective containers forming the functional unit.

For example, based on the purchase service requirement data, the E2EO module 62 may identify the number of functional unit groups that are constructed. For example, the E2EO module 62 may identify the respective types of functional unit groups that achieve the network service to be purchased and the number of functional units for each type, based on the purchased service requirement data and the requirement configuration correspondence data included in the service catalog data. For example, when the number of subscribers indicated by the service requirement data is 50,000, functional unit groups that are constructed may be identified as three P-GWs, three IMSes, and three HSSes based on the above-mentioned requirement configuration correspondence data.

Then, the E2EO module 62 may output the data indicating the respective types of functional unit groups and the number of functional units for each type to the inventory management module 66 along with the service requirement data. Then, the inventory management module 66 may determine the host name and the IP address assigned to each functional unit based on the data and the inventory data. For example, the host name and the IP address may be determined so as not to be the same as host names or IP addresses that are already being used. Then, the planned data including the host name data indicating the determined host name and the IP address data indicating the determined IP address may be generated.

Further, as described above, based on the purchase service requirement data, the E2EO module 62 may identify the location at which each of the functional units included in the constructed functional unit group is constructed. For example, the E2EO module 62 may determine the location of each functional unit included in the constructed functional unit group based on the target area data included in the purchase service requirement data and the requirement configuration correspondence data included in the service catalog data. A different location may be determined for each functional unit. Then, for each functional unit, a host name and an IP address available at the location determined for the functional unit may be determined as the host name and the IP address of the functional unit. Then, the planned data including the host name data indicating the determined host name and the IP address data indicating the determined IP address may be generated.

Further, based on the purchase service requirement data, the E2EO module 62 may identify, for each of a plurality of locations, the type and the number of functional units constructed at the location. In this case, in accordance with the location that is identified based on the purchase service requirement data, the E2EO module 62 may determine the number of functional units for each type that are constructed at the location. Further, the E2EO module 62 may determine the number of functional units for each type that are constructed for each location based on a weight set for each location identified based on the purchase service requirement data.

For example, the E2EO module 62 may store assumed busy level data illustrated in FIG. 15. The assumed busy level data illustrated in FIG. 15 indicates, for example, the population of an area covered by one or a plurality of cells under the control of a data center linked to the assumed busy level data. The value of the assumed busy level data is an example of the weight set for each location described above.

The assumed busy level data for the data center of the core network system 20 indicates, for example, the population of the area covered by the cells of one or a plurality of base station apparatus 22 communicating to/from the core network system 20.

Then, for example, more functional units may be deployed at a location with a higher population indicated by the assumed busy level data. For example, it is assumed that the total number "n" of vDUs to be deployed is identified based on the subscriber number data included in the purchase service requirement data. Then, it is assumed that a plurality of data centers, which are vDUs' deployment destinations, and are located within a target area indicated by the target area data, are identified based on the target area data included in the purchase service requirement data. In this case, based on the value of the assumed busy level data for each identified data center, the number of vDUs obtained by proportionally dividing the total number "n" of identified vDUs may be deployed at each data center.

As illustrated in FIG. 13, the container configuration data includes, for example, a container ID, a container image ID, required resource data, a resource pool group ID, a resource pool ID, and a connected container ID list.

The container ID is, for example, as described above, an identifier uniquely assigned to an instance of a container corresponding to the container configuration data.

As the container image ID included in the container configuration data, for example, a container image ID assigned to a container image of the container corresponding to the container configuration data is set.

The required resource data is, for example, data indicating a resource required to operate the container. In this embodiment, for example, the inventory template data indicates, for each container, the resource required to operate the container. The inventory management module 66 sets the value of the required resource data based on the inventory template data.

For the resource pool group ID included in the container configuration data, for example, the value of the resource pool group ID of a resource pool group to which the container corresponding to the container configuration data is assigned is set. The inventory management module 66 may determine a resource pool group ID for which the container is constructed based on, for example, the location determined as described above and the inventory data.

For the resource pool ID included in the container configuration data, for example, the value of the resource pool ID of a resource pool to which the container corresponding to the container configuration data is assigned is set. The inventory management module 66 may determine a resource pool ID based on, for example, the type of the container and the resource pool management data.

The connected container ID list is a list of container IDs of containers connected to the container. In this embodiment, for example, the inventory template data indicates, for each container, the type of a container connected to the container. The inventory management module 66 determines the value of the connected container ID list based on, for example, the inventory template data and the inventory data.

When the planned data is to be generated, the E2EO module 62 identifies a resource pool in which a new functional unit group is deployed and a required resource in cooperation with the inventory management module 66. The E2EO module 62 may identify a resource pool linked to a functional unit identified in response to the reception of a network service construction request, for example, the reception of a purchase request. Further, the E2EO module 62 may identify a resource pool group based on the target area of the network service to be purchased. For example, the resource pool group may be identified based on the target area indicated by the target area data included in the purchase service requirement data. Then, the E2EO module 62 may identify a resource pool in which a new functional unit group is deployed from among resource pools included in the identified resource pool group.

Further, the E2EO module 62 determines whether or not a hardware resource (for example, the server 90 in this case) in which the new functional unit group is deployed can be secured. For example, it is determined whether (1) the server 90 can be secured, (2) the server 90 can be secured by setting up an unused hardware resource (for example, a free server in this case) that is not included in any resource pool, or (3) the server 90 cannot be secured.

In the case of "(2)", the E2EO module 62 determines whether or not a predetermined specific type of functional unit is deployed in an unused hardware resource (for example, a free server in this case).

When a specific type of functional unit is deployed, the E2EO module 62 identifies a resource pool linked to the specific type of functional unit. For example, the resource pool is identified based on the resource pool management data.

In this embodiment, for example, the resource pool group ID of the resource pool group identified as described above and the resource pool ID of the identified resource pool are set in the container configuration data.

In this embodiment, based on, for example, the configuration of the functional unit group identified as described above and template data in which the configuration is acceptable as a parameter, the CMaaS module 68, the service manager module 70, and the slice manager module 72 identify a construction procedure of the functional unit group. The construction procedure includes, for example, a procedure of container configuration management such as deploying a container and setting the deployed container and a container related to the deployed container. This process is executed, for example, with the execution of the workflow script by the E2EO module 62 as a trigger.

The CMaaS module 68, the service manager module 70, the slice manager module 72, and the container management module 78 construct a functional unit group by executing the identified construction procedure. This process is also executed, for example, with the execution of the workflow script by the E2EO module 62 as a trigger.

Each of the functional units included in the functional unit group may be constructed at a location identified for the functional unit.

Further, for example, the number of functional unit groups identified based on the purchase service requirement data may be constructed.

Further, for example, for each of a plurality of locations, an identified number of functional units of a type identified for the location may be constructed.

The CMaaS module 68 and the BMaaS module 84 secure, for example, a hardware resource (for example, the server 90 in this case) in which a new functional unit group is deployed.

Further, the CMaaS module 68 and the BMaaS module 84 perform a system software setup in accordance with a specific type of functional unit on an unused hardware resource. In this embodiment, for example, the CMaaS module 68 or the BMaaS module 84 stores a script (for example, an Ansible script) for performing a setup for the above-mentioned specific type of functional unit. The script describes, for example, a procedure of installing a host OS serving as a platform of a container execution environment, a procedure of setting a kernel of the host OS, a procedure of setting a basic input output system (BIOS), which have a specific type or a specific version. Then, by the execution of the script by the BMaaS module 84, a system software setup in accordance with the specific type of functional unit is performed on a free server. For example, the setup of the host OS and the BIOS of the container execution environment is performed on the free server.

Then, the CMaaS module 68 and the BMaaS module 84 update the resource pool management data so as to add the unused hardware resource on which the system software setup is performed to the identified resource pool. Such addition of the hardware resource to the resource pool is detected by the container management module 78 which manages the hardware resource. Then, the inventory management module 66 updates inventory data that corresponds to the added hardware resource (server 90). This allows the resource pool to include the hardware resource on which the system software setup in accordance with the specific type of functional unit is performed.

For example, vDU is assumed to be a specific type of functional unit. It is also assumed that the number of cores required for vDU is 5 and the number of free server cores is 50.

In this case, a resource pool linked to vDU is identified when a network service including vDU is purchased. In the example of FIG. 12, a resource pool having a resource pool ID of "C" is identified. Then, whether or not the remaining hardware resources of this resource pool are sufficient is examined. Then, when the remaining hardware resources are insufficient, a system software setup in accordance with vDU is performed on one free server. Then, the server 90 on which the system software setup has been performed is added to the resource pool C, and the resource pool management data is updated to the resource pool management data illustrated in FIG. 16.

In this manner, in this embodiment, a system software setup in accordance with one or more types of functional units linked to the resource pool is performed on the hardware resources included in the resource pool corresponding to the resource pool data.

Depending on the type of a functional unit, sufficient performance may not be able to be exhibited by using a general-purpose server having a general configuration. To deal with the problem, for such a specific type of functional unit, it is desired that a dedicated setup be performed on hardware resources, for example, a server, with regard to system software such as a host OS and BIOS. In this case, one possible option is to prepare in advance the required number of hardware resources on which such a dedicated system software setup has been performed before the network service is started to be provided, and, when required, deploy the functional unit on the prepared hardware resources.

However, it is difficult to estimate the optimal amount of hardware resources on which the system software setup in accordance with the specific type of functional unit is to be performed in advance before the network service is started to be provided. Further, when the system software setup in accordance with the specific type of functional unit is performed on many hardware resources with an enough margin, such hardware resources are not suitable for the deployment of other functional units and thus result in wasting of resources.

In this embodiment, as described above, when a specific type of functional unit is deployed on an unused hardware resource, a system software setup in accordance with the specific type of functional unit is performed on an unused hardware resource. Then, the unused hardware resource on which the system software setup has been performed is added to a resource pool linked to the specific type of functional unit.

In this manner, according to this embodiment, it is possible to effectively utilize hardware resources on which various functional units that achieve a network service are deployed.

In this embodiment, the functional units may be identified based on results of demand forecasting. For example, based on the results of the demand forecasting, functional units predicted to be in short supply in the near future may be identified. Then, a resource pool linked to the functional units thus identified may be identified. Then, an unused hardware resource on which a system software setup in accordance with the functional units has been performed may be added to the resource pool.

When the hardware resource for deploying a new functional unit group is secured, the service manager module 70 instructs the container management module 78 to deploy the new functional unit group, for example, based on the abovementioned planed data and service template data linked to the purchase bundle ID stored in the service manager module 70. The service template data can accept a part or all of the planned data as a parameter.

A CNF descriptor (CNFD) is an example of the abovementioned service template data. FIG. 17 is a diagram for illustrating an example of the CNFD. The service manager module 70 generates, for example, a day 0 parameter (CNF instance) illustrated in FIG. 18 based on the planned data and the CNFD. For example, the day 0 parameter illustrated in FIG. 18 in which the value of a host name and the value of an IP address of the CNFD illustrated in FIG. 17 are set is generated.

The CNFD may include a template associated with each of a plurality of deployment flavors. Then, for example, the service manager module 70 may generate the day 0 parameter based on a template corresponding to a deployment flavor in accordance with the purchase service requirement data.

The service manager module 70 may identify the location of the output destination of the day 0 parameter. For example, one or a plurality of container management modules 78 that serve as output destinations of the day 0 parameter may be identified. For example, a container management module 78 associated with a server 90 arranged at the location of a resource pool indicated by the container configuration data of the planned data may be identified. Then, a day 0 parameter that is output to each of identified locations may be generated. For example, a day 0 parameter that is output to each of one or a plurality of container management modules 78 that serve as the output destinations may be generated.

Then, the service manager module 70 outputs each of the generated one or plurality of day 0 parameters to a container management module 78 serving as the location of the output destination of the day 0 parameter. A purchase bundle ID is linked to the day 0 parameter.

Then, the container management module 78 deploys a new functional unit group based on the received day 0 parameter. The container management module 78 identifies a container image to be deployed and a resource pool in which the container is deployed, for example, based on Helm chart data associated with the purchase bundle ID and on the received day 0 parameter. Then, the container management module 78 acquires the container image from the repository unit 80 and deploys a container corresponding to the container image in the identified resource pool. For example, a manifest file is generated based on the Helm chart data associated with the purchase bundle ID and on the received day 0 parameter. Then, the deployment of a container is executed through use of the manifest file.

Further, the CMaaS module 68 generates planned CM data including a day 1 parameter, for example, based on the above-mentioned planned data and CM template data stored in the CMaaS module 68 and linked to the purchase bundle ID. The CM template data can accept a part or all of the planned data as a parameter.

The day 1 parameter indicates, for example, a configuration management procedure, for example, the settings of a deployed functional unit group and at least one functional unit related to the functional unit group (for example, a functional unit communicating to/from the deployed functional unit group). A day 1 parameter relating to the base station apparatus 22 indicates, for example, radio field intensity, the direction and angle of the antenna 22a, a serial number, and the like. A day 1 parameter relating to a serving-gateway (S-GW) indicates, for example, information indicating an opposite node (information indicating a mobility management entity (MME) or an access point name (APN) of a communication partner), the host name or FQDN of a Remote Authentication Dial In User Service (RADIUS) server, and the like.

Then, the CMaaS module 68 executes configuration management, for example, the setting of the functional unit, based on the day 1 parameter included in the generated planned CM data. Those processes are executed, for example, with the execution of the workflow script by the E2EO module 62 as a trigger.

Then, the slice manager module 72 executes, for example, instantiation of a network slice pertaining to a network service to be purchased, based on the above-mentioned planned data and slice template data linked to the purchase bundle ID stored in the slice manager module 72. The slice template data can accept a part or all of the planned data as a parameter. This process is executed, for example, with the execution of the workflow script by the E2EO module 62 as a trigger.

The slice manager module 72 may output a configuration management instruction related to the instantiation of the network slice to the CMaaS module 68. Then, the CMaaS module 68 may execute configuration management, for example, settings in accordance with the configuration management instruction.

For example, the CMaaS module 68 may execute configuration management regarding new functional unit groups when the deployment of the new functional unit groups is completed, and then execute configuration management related to the instantiation of the network slice.

As another example, the CMaaS module 68 may update a once-generated day 1 parameter based on the configuration management instruction received from the slice manager module 72. Then, the CMaaS module 68 may collectively perform the configuration management related to the new functional unit groups and the instantiation of the network slice.

In this embodiment, for example, the monitoring management module 74 identifies a monitoring policy indicated by the purchase service requirement data based on the above-mentioned planned data and monitoring script data linked to the purchase bundle ID stored in the monitoring management module 74. Then, the monitoring management module 74 executes a monitoring setting in accordance with the identified monitoring policy. Then, in accordance with the identified monitoring policy, the monitoring management module 74 monitors a functional unit group which is constructed. For example, monitoring of a monitoring target indicated by the purchase service requirement data may be executed at a monitoring interval indicated by the purchase service requirement data. This process is executed, for example, with the execution of the workflow script by the E2EO module 62 as a trigger.

The monitoring management module 74 may deploy, for example, a sidecar which outputs the value of the metric of the monitoring target linked to the container of the monitoring target as a log at the above-mentioned monitoring interval. Then, the sidecar may output the log to the monitoring management module 74 in accordance with the above-mentioned monitoring setting. Then, the monitoring management module 74 may accumulate the log. Then, the monitoring management module 74 may, for example, transmit the log to the purchaser terminal 14 in response to a request from the purchaser terminal 14.

For example, in this embodiment, the security setting module 76 executes a security setting, for example, a password setting, in accordance with the value of the purchase service requirement data based on, for example, the above-mentioned planned data and the security script data stored in the security setting module 76 and linked to the purchase bundle ID.

The respective flows of processes performed by the vendor terminal 16, the MPS 10, and the NOS 12 when the "ONBOARDING" button 40 is clicked by a vendor on an onboarding screen illustrated in FIG. 7 is described with reference to flowcharts illustrated in FIG. 19A and FIG. 19B.

First, the vendor terminal 16 transmits bundle data arranged in a path specified on the onboarding screen to the bundle development module 60 of the NOS 12 (Step S101).

Then, the bundle development module 60 develops the bundle data received in the process step of Step S101 and generates a data group illustrated in FIG. 9 (Step S102).

Then, the bundle development module 60 determines a bundle ID corresponding to the data group generated in the process step of Step S102 (Step S103).

The bundle development module 60 then transmits product catalog data included in the data group generated in the process step of Step S102 that is linked to the bundle ID determined in the process step of Step S103 to the bundle management module 50 of the MPS 10. Then, the bundle management module 50 of the MPS 10 stores the received product catalog data in the product catalog storage unit 52 (Step S104).

The bundle development module 60 then outputs to the E2EO module 62 service catalog data included in the data group generated in the process step of Step S102 that is linked to the bundle ID determined in the process step of Step S103. Then, the E2EO module 62 stores the received service catalog data in the service catalog storage unit 64 (Step S105).

The bundle development module 60 stores inventory template data included in the data group generated in the process step of Step S102 that is linked to the bundle ID determined in the process step of Step S103 in the inventory management module 66 (Step S106).

Then, the bundle development module 60 stores CM template data included in the data group generated in the process step of Step S102 that is linked to the bundle ID determined in the process step of Step S103 in the CMaaS module 68 (Step S107).

The bundle development module 60 then stores service template data included in the data group generated in the process step of Step S102 that is linked to the bundle ID determined in the process step of Step S103 in the service manager module 70 (Step S108).

Then, the bundle development module 60 stores slice template data included in the data group generated in the process step of S102 that is linked to the bundle ID determined in the process step of Step S103 in the slice manager module 72 (Step S109).

The bundle development module 60 stores monitoring script data included in the data group generated in the process step of Step S102 that is linked to the bundle ID determined in the process step of Step S103 in the monitoring management module 74 (Step S110).

Then, the bundle development module 60 stores security script data included in the data group generated in the process step of Step S102 that is linked to the bundle ID determined in the process step of Step S103 in the security setting module 76 (Step S111).

The bundle development module 60 then stores Helm chart data included in the data group generated in the process step of Step S102 that is linked to the bundle ID determined in the process step of Step S103 in the container management module 78 (Step S112). For example, the bundle development module 60 may store the Helm chart included in the data group generated in the process step of Step S102 in a plurality of container management modules 78. Further, Helm chart data associated with the container management module 78 may be stored in the container management module 78.

Then, the bundle development module 60 stores container image data included in the data group generated in the process step of Step S102 that is linked to the bundle ID determined in the process step of Step S103 in the repository unit 80 (Step S113), and the process illustrated in this process example is ended.

With reference to the flowchart illustrated in FIG. 20, description is now given of the flow of processes executed by the purchaser terminal 14, the MPS 10, and the NOS 12 when the "NEXT" button 32 is clicked by the purchaser on the service requirement input screen illustrated in FIG. 3.

First, the purchaser terminal 14 transmits the purchase service requirement data linked to the purchase bundle ID to the purchase management module 54 of the MPS 10 (Step S201). The purchase bundle ID is the bundle ID of a network service selected by the purchaser on the purchase screen illustrated in FIG. 2. The purchase service requirement data is service requirement data indicating the details of input onto the service requirement input screen illustrated in FIG. 3.

Then, the purchase management module 54 of the MPS 10 transmits the purchase service requirement data linked to the purchase bundle ID received in the process step of Step S201 to the E2EO module 62 of the NOS 12 (Step S202).

The E2EO module 62 of the NOS 12 then generates availability inquiry data based on the service catalog data linked to the purchase bundle ID (Step S203). For example, availability inquiry data that indicates the types of functional unit groups that achieve the network service to be purchased and the number of functional units for each type is generated.

Then, the E2EO module 62 outputs the availability inquiry data generated in the process step of Step S203 to the inventory management module 66 (Step S204).

Then, the inventory management module 66 generates availability data based on the received availability inquiry data, inventory data, and inventory template data (Step S205). For example, availability data that indicates whether (1) a hardware resource in which a functional unit group indicated by the received availability inquiry data is deployed can be secured, (2) the hardware resource can be secured by adding a free server to the resource pool, or (3) the hardware resource cannot be secured is generated.

Then, the inventory management module 66 transmits the availability data generated in the process step of Step S205 to the E2EO module 62 (Step S206).

The E2EO module 62 then generates reply data based on the availability data received in the process step of Step S206 (Step S207). For example, when the availability data indicates "(1)" or "(2)" described above, reply data indicating "OK" is generated, and when the availability data indicates "(3)" described above, reply data indicating "NG" is generated.

Then, the E2EO module 62 transmits the reply data generated in the process step of Step S207 to the purchase management module 54 of the MPS 10 (Step S208).

The purchase management module 54 then generates a purchase confirmation screen based on the reply data received in the process step of Step S208 (Step S209). For example, when the received replay data indicates "OK", a purchase confirmation screen illustrated in FIG. 4 indicating that the service can be immediately provided generated. Meanwhile, when the received reply data indicates "NG", a purchase confirmation screen illustrated in FIG. 5 indicating that a predetermined turnaround time is required (for example, turnaround time of 2 weeks is required) is generated.

Then, the purchase management module 54 transmits the purchase confirmation screen generated in the process step of Step S209 to the purchaser terminal 14 (Step S210).

The purchaser terminal 14 then displays the purchase confirmation screen received in the process step of Step S210 on the display of the purchaser terminal 14 (Step S211), and the process shown in this process example is ended.

Figure 21:
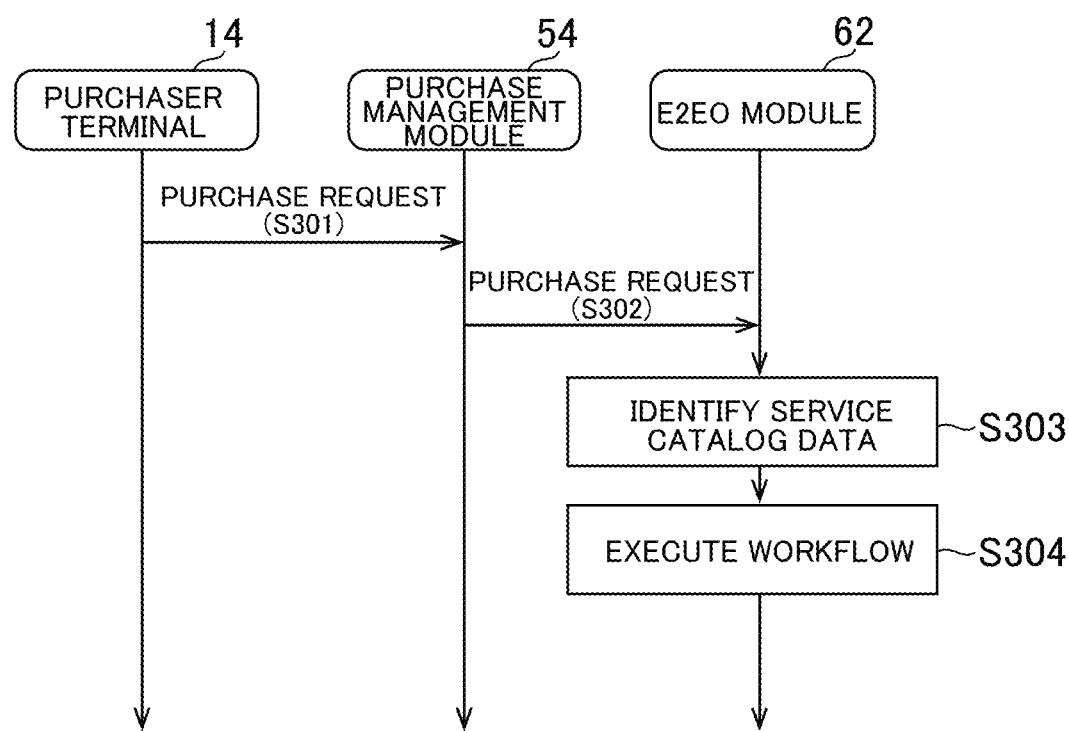
FIG. 21 is a flowchart for illustrating an example of the flow of processes performed by the purchaser terminal, the MPS, and the NOS in the one embodiment of the present invention.
Figure 22A:
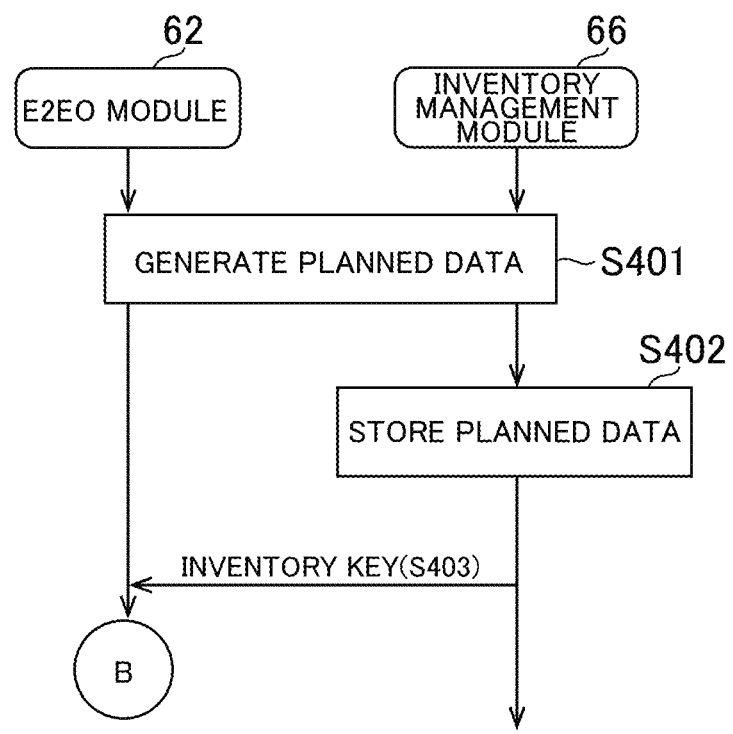
FIG. 22A is a flowchart for illustrating an example of a flow of processes performed by an NOS in the one embodiment of the present invention.
Figure 22B:
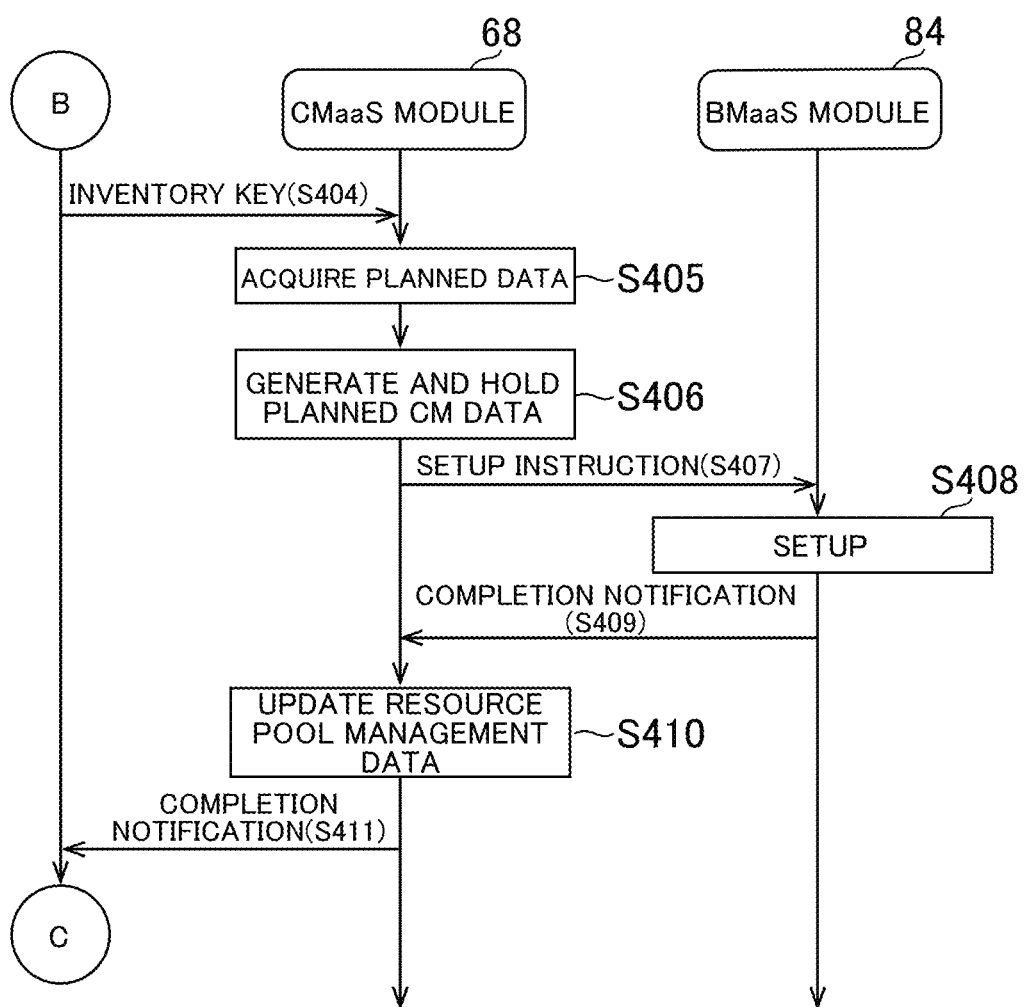
FIG. 22B is a flowchart for illustrating an example of the flow of processes performed by the NOS in the one embodiment of the present invention.
Figure 22D:
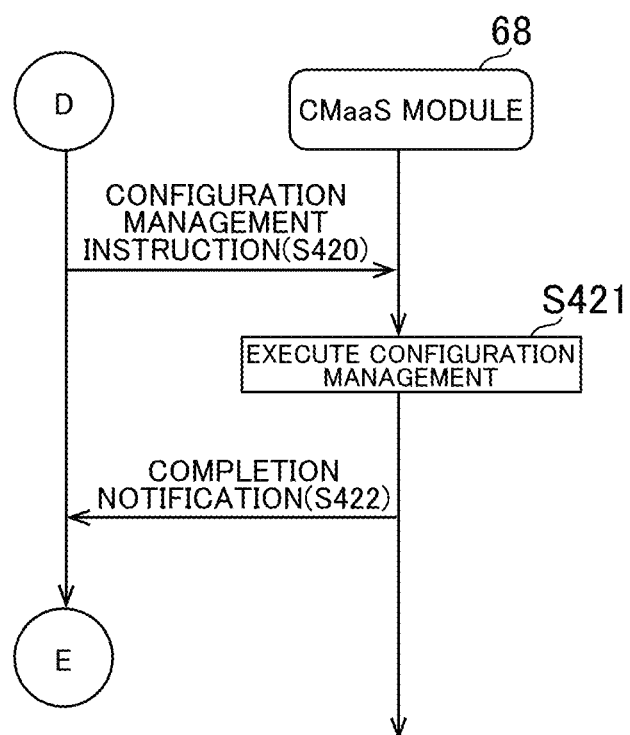
FIG. 22D is a flowchart for illustrating an example of the flow of processes performed by the NOS in the one embodiment of the present invention.
Figure 22E:
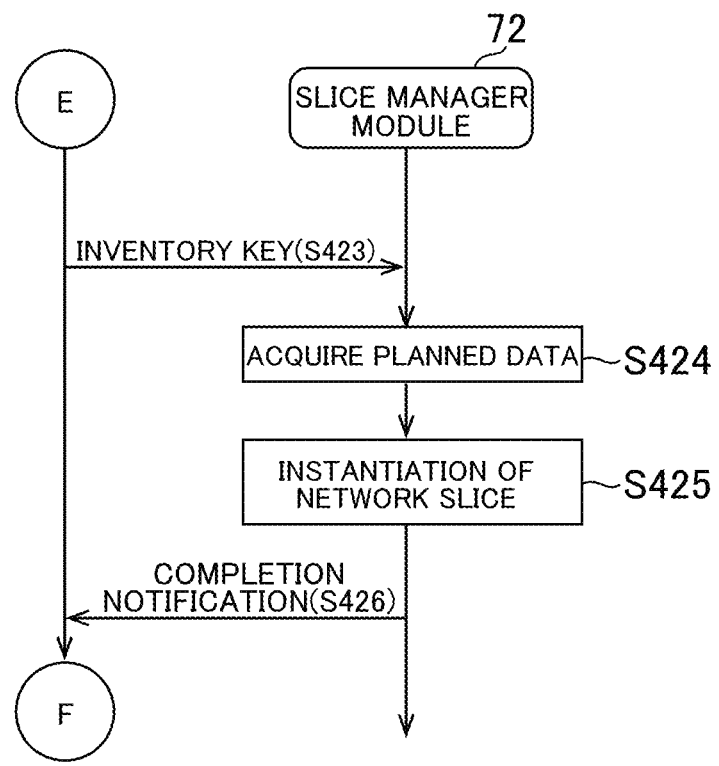
FIG. 22E is a flowchart for illustrating an example of the flow of processes performed by the NOS in the one embodiment of the present invention.
Figure 22F:
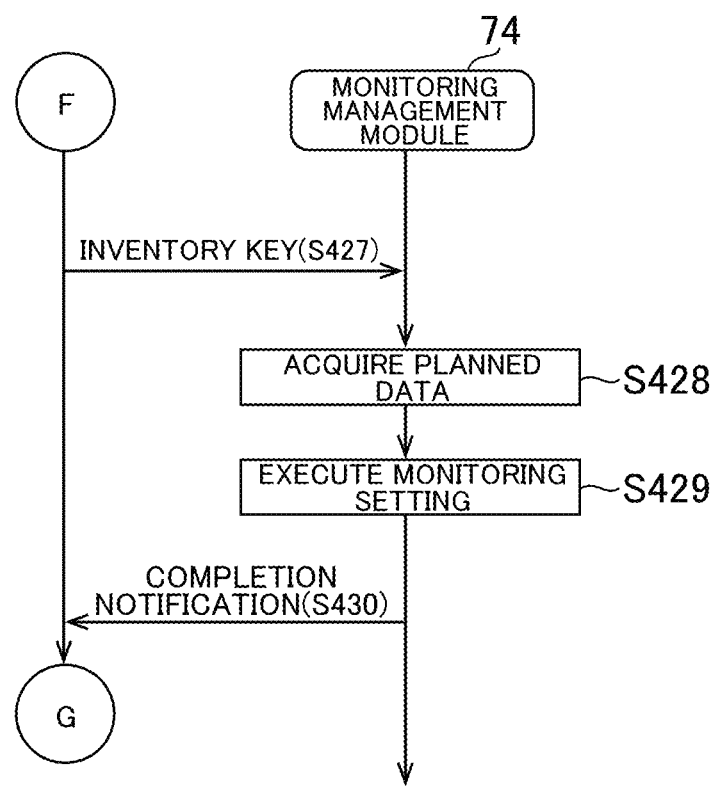
FIG. 22F is a flowchart for illustrating an example of the flow of processes performed by the NOS in the one embodiment of the present invention.
Figure 22G:
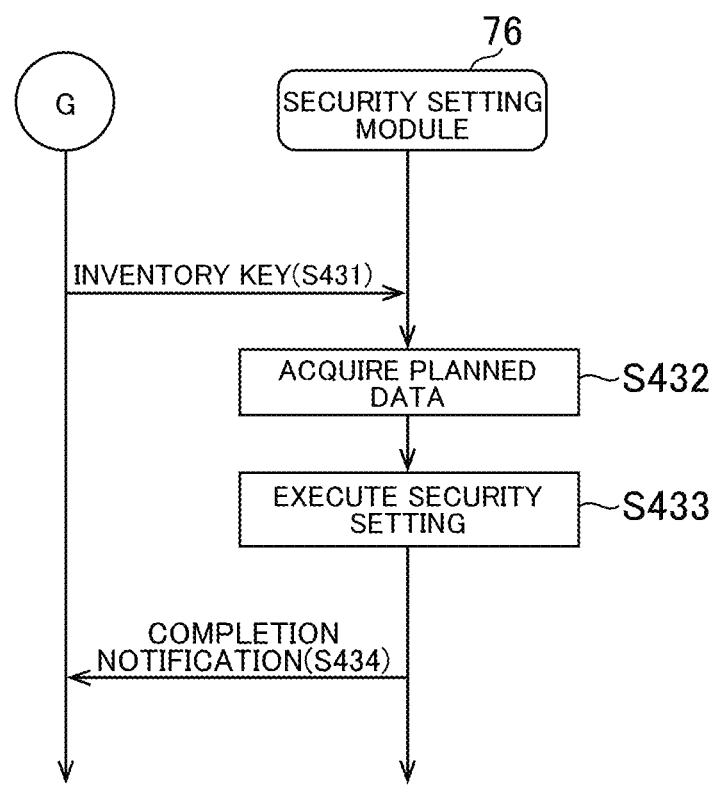
FIG. 22G is a flowchart for illustrating an example of the flow of processes performed by the NOS in the one embodiment of the present invention.

With reference to the flowchart illustrated in FIG. 21, description is given of the flow of processes executed by the purchaser terminal 14, the MPS 10, and the NOS 12 when the "PURCHASE" button 34 is clicked by the purchaser on the purchase confirmation screen illustrated in FIG. 4 or FIG. 5.

First, the purchaser terminal 14 transmits a purchase request for the network service to the purchase management module 54 of the MPS 10 (Step S301). It is assumed that the purchase request is linked to the purchase bundle ID and the purchase service requirement data transmitted in the process step of Step S201.

Then, the purchase management module 54 transmits to the E2EO module 62 the purchase request linked to the purchase bundle ID and the purchase service requirement data received in the process step of Step S301 (Step S302).

The E2EO module 62 then identifies service catalog data corresponding to the purchase bundle ID linked to the received purchase request (Step S303).

Then, the E2EO module 62 acquires the service catalog data identified in the process step of Step S303 from the service catalog storage unit 64 and executes the workflow script indicated by the service catalog data (Step S304), and the process shown in this process example is ended.

The details of the process step of Step S304 is now described with reference to the flowcharts illustrated in FIG. 22A to FIG. 22G.

First, the E2EO module 62 and the inventory management module 66 generate planned data based on the purchase service requirement data linked to the purchase request, service catalog data, inventory template data, and inventory data (Step S401). The process to be executed in Step S401 includes, for example, a process of identifying a resource pool in which a functional unit group is deployed, and a required resource.

Then, the inventory management module 66 stores the generated planned data in the inventory database 82 (Step S402).

The inventory management module 66 then outputs an inventory key included in the generated planned data to the E2EO module 62 (Step S403).

Then, the E2EO module 62 outputs the inventory key that has been received to the CMaaS module 68 (Step S404).

The CMaaS module 68 then acquires planned data including the received inventory key from the inventory database 82 (Step S405).

Then, the CMaaS module 68 generates and holds planned CM data including a day 1 parameter based on the planned data acquired in the process step of Step S405 (Step S406).

The CMaaS module 68 outputs an instruction for a setup, for example, securing required hardware resources, to the BMaaS module 84 (Step S407), and the BMaaS module 84 executes a setup, for example, securing hardware resources in accordance with the instruction (Step S408). At this time, the setup of system software in accordance with a specific type of functional unit and addition of a free server to the resource pool are executed as required.

In this embodiment, a free server may be added to the resource pool with an enough margin (buffer). For example, a plurality of servers 90 may be collectively added to the resource pool.

Then, when the BMaaS module 84 outputs a completion notification to the CMaaS module 68 (Step S409), the CMaaS module 68 updates the resource pool management data (Step S410). For example, the value of the remaining core number data of the resource pool for which the hardware resources are secured may be subtracted. Further, the number of free servers and the value of the total core number data may be updated. In the process step of Step S410, instead of the CMaaS module 68, the BMaaS module 84 may update the resource pool management data. Further, the inventory management module 66 may update the resource pool management data in accordance with an instruction from the CMaaS module 68.

Then, the CMaaS module 68 outputs a completion notification to the E2EO module 62 (Step S411).

Then, the E2EO module 62 outputs the inventory key received in the process step of Step S403 to the service manager module 70 (Step S412).

The service manager module 70 then acquires planned data including the received inventory key from the inventory database 82 (Step S413).

Then, the service manager module 70 identifies a location at which the functional unit group is deployed based on the planned data acquired in the process step of Step S418 (Step S414).

The service manager module 70 then generates a day 0 parameter (CNF instance) for each location identified in the process step of Step S414 (Step S415).

Then, to a container management module 78 corresponding to each location identified in the process step of Step S414, the service manager module 70 outputs a day 0 parameter corresponding to the container management module 78 (Step S416).

The container management module 78 then executes the deployment of a container based on the day 0 parameter that has been received (Step S417).

The container management module 78 then outputs a completion notification to the service manager module 70 (Step S418).

Then, the service manager module 70 outputs the completion notification to the E2EO module 62 (Step S419).

The E2EO module 62 then outputs a configuration management instruction that is based on the day 1 parameter to the CMaaS module 68 (Step S420).

Then, the CMaaS module 68 executes the configuration management of a container group that is based on the day 1 parameter included in the held planned CM data (Step S421).

The CMaaS module 68 then outputs a completion notification to the E2EO module 62 (Step S422).

Then, the E2EO module 62 outputs the inventory key received in the process step of Step S403 to the slice manager module 72 (Step S423).

The slice manager module 72 then acquires planned data including the received inventory key from the inventory database 82 (Step S424).

Then, the slice manager module 72 executes the instantiation of a network slice based on the planned data acquired in the process step of Step S429 (Step S425). In the process step of Step S425, for example, as described above, the slice manager module 72 may output a configuration management instruction related to the instantiation of the network slice to the CMaaS module 68. Then, the CMaaS module 68 may execute configuration management, for example, settings in accordance with the configuration management instruction.

Further, as described above, the CMaaS module 68 may update the day 1 parameter based on the configuration management instruction received from the slice manager module 72 in the process step of Step S425 without executing the process steps of from Step S420 to Step S422. Then, the CMaaS module 68 may execute configuration management, for example, settings in accordance with the configuration management instruction.

Then, the slice manager module 72 outputs a completion notification to the E2EO module 62 (Step S426).

The E2EO module 62 then outputs the inventory key received in the process step of Step S403 to the monitoring management module 74 (Step S427).

Then, the monitoring management module 74 acquires planned data including the received inventory key from the inventory database 82 (Step S428).

Based on the planned data acquired in the process step of Step S428, the monitoring management module 74 then executes a monitoring setting in accordance with a monitoring policy indicated by the purchase service requirement data (Step S429).

Then, the monitoring management module 74 outputs a completion notification to the E2EO module 62 (Step S430).

The E2EO module 62 then outputs the inventory key received in the process step of Step S403 to the security setting module 76 (Step S431).

Then, the security setting module 76 acquires planned data including the received inventory key from the inventory database 82 (Step S432).

The security setting module 76 then executes a security setting based on the planned data acquired in the process step of Step S432 (Step S433).

Then, the security setting module 76 outputs a completion notification to the E2EO module 62 (Step S434), and the process shown in this process example is ended.

Note that, the present invention is not limited to the embodiment described above.

For example, the network service to be provided to the purchaser may be implemented by a virtualized network function (VNF), which is a virtual machine (VM)-based functional unit that uses a hypervisor-type or host-type virtualization technology, instead of a CNF, which is a container-based functional unit. When a specific type of functional unit is deployed in an unused hardware resource (for example, a free server in this case), the setup of system software in accordance with the specific type of functional unit may be performed on a host OS serving as a platform of a virtual machine environment.

Further, for example, the division of roles for each function illustrated in FIG. 8 is not limited to that illustrated in FIG. 8. For example, part of the processes performed by the E2EO module 62 may be performed by the inventory management module 66. Further, for example, part of the processes performed by the inventory management module 66 may be performed by the E2EO module 62.

Further, in this embodiment, the repository unit 80 is not required to be included in the NOS 12. The bundle development module 60 may store the helm chart data and the container image data in the container management module 78. Then, the container management module 78 may deploy the container image stored in the container management module 78.

Further, in this embodiment, the bundle development module 60 is not required to be included in the NOS 12. For example, a bundle file may be on-boarded from an external file transfer server.

The invention claimed is:

1. A network service construction system, comprising:
   at least one processor; and
   at least one memory device storing instructions which, when executed by the at least one processor, cause the at least one processor to perform operations comprising:
   receiving service requirement data indicating a service requirement;
   identifying, based on the service requirement data, a configuration of a functional unit group that achieves a network service;
   receiving a bundle file defining a data group corresponding to the network service;
   identifying a construction procedure of the functional unit group based on the identified configuration and template data in which the configuration is acceptable as a parameter, the construction procedure of the function unit group is based on the data group of the bundle file; and
   constructing the functional unit group by executing the identified construction procedure.

2. The network service construction system according to claim 1,
   wherein the identifying the configuration comprises identifying, based on the service requirement data, a location at which each of functional units included in the functional unit group is to be constructed, and
   wherein constructing each of the functional units included in the functional unit group at the location identified for the each of the functional units.

3. The network service construction system according to claim 1,
   wherein the identifying the configuration comprises identifying, based on the service requirement data, the number of functional unit groups to be constructed, and
   wherein constructing the identified number of functional unit groups.

4. The network service construction system according to claim 1,
   wherein the identifying the configuration comprises identifying, for each of a plurality of locations, a type and the number of functional units to be constructed at the each of the plurality of locations, based on the service requirement data, and
   wherein constructing, for each of the plurality of locations, an identified number of functional units of a type identified for the each of the plurality of locations.

5. The network service construction system according to claim 4, wherein, the identifying the configuration comprises determining, in accordance with a location identified based on the service requirement data, the number of functional units for each type to be constructed at the location.

6. The network service construction system according to claim 5, wherein the identifying the configuration comprises determining, based on a weight set for each of the locations, the number of functional units for each type to be constructed at the each of the locations.

7. The network service construction system according to claim 1, wherein identifying the configuration based on the service requirement data and inventory data indicating a status of a managed resource.

8. The network service construction system according to claim 7, wherein the identifying the configuration comprises identifying, based on the inventory data, at least one of a host name or an IP address of each of the functional units included in the functional unit group.

9. The network service construction system according to claim 8, wherein the identifying the configuration comprises identifying, based on the inventory data, at least one of the host name or the IP address of each of the functional units so that at least one of the host name or the IP address is prevented from being the same as at least one of the host name or the IP address that is already being used.

10. The network service construction system according to claim 8, wherein the identifying the configuration comprises identifying at least one of the host name or the IP address of each of the functional units based on the location at which the each of the functional units is to be constructed.

11. The network service construction system according to claim 7, wherein the operations further comprise notifying a purchaser of the network service of a turnaround time of the network service which is identified based on the inventory data.

12. The network service construction system according to claim 1, the constructing comprises executing, after the deployment of a new functional unit group, configuration management of the deployed functional unit group and at least one functional unit related to the functional unit group.

13. The network service construction system according to claim 12, wherein the constructing comprises executing, after the configuration management, configuration management related to instantiation of a network slice pertaining to the network service.

14. The network service construction system according to claim 1,
    wherein the identifying the construction procedure comprises generating a day 1 parameter indicating a configuration management procedure for a functional unit group to be deployed,
    wherein the identifying the construction procedure comprises updating the day 1 parameter based on a configuration management instruction related to instantiation of a network slice pertaining to the network service, and
    wherein the constructing comprises executing configuration management of at least one functional unit based on the day 1 parameter.

15. The network service construction system according to claim 1,
- wherein the identifying the construction procedure comprises generating a day 0 parameter indicating a deployment procedure of the functional unit group, and
- wherein the constructing comprises deploying the functional unit group based on the day 0 parameter.

16. The network service construction system according to claim 1,
- wherein the identifying the configuration comprises identifying, based on the service requirement data, a monitoring policy of the functional unit group to be deployed, and
- wherein the operations further comprise monitoring, in accordance with the identified monitoring policy, the functional unit which is constructed.

17. The network service construction system according to claim 1, wherein the bundle file is a vendor generated bundle file, and wherein the operations further comprise:
- receiving the vendor generated bundle file, wherein the vendor generated bundle file is generated by a vendor different from a purchaser of the network service; and
- generating, based on the vendor generated bundle file, requirement configuration correspondence data, which indicates a correspondence between a value of the service requirement data and the configuration of the functional unit group, and the template data,
- wherein the identifying the configuration comprises identifying the configuration of the functional unit group based on the received service requirement data and the requirement configuration correspondence data.

18. The network service construction system according to claim 1, wherein the bundle file includes business section data indicating business requirements of the network service, technology section data indicating the configuration of a functional unit group that achieves the network service, security section data indicating a security definition of the network service, and operation section data indicating a monitoring policy regarding the network service.

19. The network service construction system according to claim 1, wherein functional units included in the functional unit group are implemented as containers.

20. A network service construction method, comprising:
- receiving service requirement data indicating a service requirement;
- identifying, based on the service requirement data, a configuration of a functional unit group that achieves a network service;
- receiving a bundle file defining a data group corresponding to the network service;
- identifying a construction procedure of the functional unit group based on the identified configuration and template data in which the configuration is acceptable as a parameter, the construction procedure of the function unit group is based on the data group of the bundle file; and
- constructing the functional unit group by executing the identified construction procedure.

* * * * *